US012443457B2

(12) United States Patent
Goksen

(10) Patent No.: US 12,443,457 B2
(45) Date of Patent: Oct. 14, 2025

(54) EFFICIENT RANDOM SAMPLING FROM DYNAMICALLY CHANGING SAMPLE POOL

(71) Applicant: Microsoft Technology Licensing, LLC, Redmond, WA (US)

(72) Inventor: Can Goksen, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 708 days.

(21) Appl. No.: 17/713,628

(22) Filed: Apr. 5, 2022

(65) Prior Publication Data
US 2023/0205593 A1    Jun. 29, 2023

Related U.S. Application Data

(60) Provisional application No. 63/294,542, filed on Dec. 29, 2021.

(51) Int. Cl.
G06F 9/50 (2006.01)

(52) U.S. Cl.
CPC .......... *G06F 9/5044* (2013.01); *G06F 9/5033* (2013.01); *G06F 9/5088* (2013.01); *G06F 2209/5011* (2013.01); *G06F 2209/508* (2013.01)

(58) Field of Classification Search
CPC .......... G06F 9/45558–5094; G06F 2209/5011; G06F 2209/508
See application file for complete search history.

(56) References Cited

U.S. PATENT DOCUMENTS 6,732,085 B1    5/2004 Mozes
7,092,399 B1 *  8/2006 Cheriton ............. H04L 67/1001
                                                 370/401
(Continued)

FOREIGN PATENT DOCUMENTS

EP    3916652 A1    12/2021

OTHER PUBLICATIONS

PAPSO: A Power-Aware VM Placement Technique Based on Particle Swarm Optimization Abdelhameed Ibrahim, Mostafa Noshy, Hesham Arafat Ali (Year: 2020).*

(Continued)

*Primary Examiner* — April Y Blair
*Assistant Examiner* — Paul V Mills
(74) *Attorney, Agent, or Firm* — Holzer Patel Drennan

(57) ABSTRACT

A method for cost-efficient repeated random sampling from a dynamically-changing sampling pool includes defining an array of elements to be selectively masked and unmasked throughout repeated random sampling operations from a first sampling pool. The first sampling pool includes unmasked elements of the array and excludes masked elements of the array. The method further includes identifying an exclusion element within the first sampling pool that is to be excluded from a sampling operation and removing the exclusion element from the first sampling pool. Removing the exclusion element is achieved by moving the exclusion element to a new position by swapping an array index of the exclusion element with an array index that was, during an immediately prior sampling operation, included within and bounding the first sampling pool and by masking the array index corresponding to a new position of the exclusion element. Following the swapping and masking operations, the first sampling pool is randomly sampled.

18 Claims, 12 Drawing Sheets

(56) References Cited

U.S. PATENT DOCUMENTS

| | | | |
|---|---|---|---|
| 9,104,483 B2* | 8/2015 | Natarajan | G06F 9/5027 |
| 9,250,874 B1* | 2/2016 | Verwaest | G06F 8/437 |
| 9,300,523 B2 | 3/2016 | Alon et al. | |
| 9,405,686 B2 | 8/2016 | Waldspurger et al. | |
| 10,083,100 B1* | 9/2018 | Agetsuma | G06F 11/2094 |
| 10,902,014 B1* | 1/2021 | Adogla | G06F 16/27 |
| 11,106,713 B2 | 8/2021 | Miller et al. | |
| 11,182,691 B1 | 11/2021 | Zhang | |
| 2017/0230171 A1 | 8/2017 | Gadepally et al. | |
| 2017/0230306 A1* | 8/2017 | Cropper | H04M 15/00 |
| 2017/0235587 A1* | 8/2017 | Vully | G06F 3/067 718/1 |
| 2019/0065247 A1* | 2/2019 | Ros-Giralt | G06F 16/9017 |
| 2020/0387490 A1* | 12/2020 | Schulze | G06F 16/2379 |
| 2021/0105322 A1* | 4/2021 | Sakashita | H04L 67/1097 |

OTHER PUBLICATIONS

Server-Storage Virtualization: Integration and Load Balancing in Data Centers Aameek Singh, Madhukar Korupolu, Dushmanta Mohapatra (Year: 2008).*

Doing the Two-Step for Efficient Reversible Deletes David R. MacIver www.drmaciver.com/2018/06/doing-the-two-step-for-efficient-reversible-deletes/ (Year: 2018).*

A hybrid MIP-based large neighborhood search heuristic for solving the machine reassignment problem W. Jaskowski, M. Szubert, P. Gawron (Year: 2016).*

Data Structures Part 1: Bulk Data Niklas Gray ruby0x1.github.io/machinery_blog_archive/post/data-structures-part-1-bulk-data/index.html (Year: 2019).*

Ryerson University, School of Computer Science CPS109 Fall 2015 course website Course Management Form, main page, Arrays and Array Lists class notes (Year: 2015).*

Virtual Machine Migration in Cloud Infrastructures: Problem Formalization and Policies Proposal Alessandro Vittorio Papadopoulos, Martina Maggio (Year: 2015).*

"International Search Report and Written Opinion Issued in PCT Application No. PCT/US22/044045", Mailed Date: Dec. 5, 2022, 11 Pages.

Tao, et al., "Random Sampling for Continuous Streams with Arbitrary Updates", In Journal of IEEE Transactions on Knowledge and Data Engineering, vol. 19, Issue 1, Jan. 1, 2007, pp. 96-110.

"Dancing Links", Retrieved From: https://web.archive.org/web/20220131124734/http://en.wikipedia.org/wiki/Dancing_Links, Jan. 31, 2022, 4 Pages.

"Greedy randomized adaptive search procedure", Retrieved From: https://web.archive.org/web/20210506161803/http://en.wikipedia.org/wiki/Greedy_randomized_adaptive_search_procedure, May 6, 2021, 2 Pages.

"Knuth's Algorithm X", Retrieved From: https://web.archive.org/web/20080622040253/http://en.wikipedia.org:80/wiki/Knuth's_Algorithm_X, Jun. 22, 2008, 6 Pages.

Asadi et al., "Analytical Evaluation of Resource Allocation Algorithms and Process Migration Methods in Virtualized Systems," Sustainable Computing: Informatics and Systems, vol. 25, Mar. 2020, 16 pages.

Communication under Rule 71(3) Received for European Application No. 22786660.5, mailed on Jun. 17, 2025, 7 pages.

* cited by examiner

EFFICIENT RANDOM SAMPLING FROM DYNAMICALLY CHANGING SAMPLE POOL

CROSS-REFERENCE TO RELATED APPLICATIONS

The present application claims priority to U.S. provisional application No. 63/294,542, entitled "Efficient Random Sampling from Dynamically Changing Sample Pool," and filed on Dec. 29, 2021, which is hereby incorporated by reference for all that it discloses or teaches.

BACKGROUND

Systems that utilize dynamically-changing pools for random sampling can consume significant compute power and processing resources. This is particularly true in systems that include large, frequently-changing sample pools and in use cases where the sample pool is frequently accessed (e.g., millions of samples per hour).

SUMMARY

According to one implementation, a method for cost-efficiently performing repeated random sampling operations from a first sampling pool includes: defining an array of elements to be selectively masked and unmasked throughout the repeated random sampling operations from the first sampling pool; identifying an exclusion element within the first sampling pool that is to be excluded from a sampling operation; and removing the exclusion element from the first sampling pool. Removing the exclusion element form the first sampling pool is performed by moving the exclusion element to a new position by swapping an array index of the exclusion element with an array index that was, during an immediately prior sampling operation, included within and bounding the first sampling pool and by masking the array index corresponding to the new position of the exclusion element. The method further comprises implementing the sampling operation by randomly sampling from the first sampling pool.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Other implementations are also described and recited herein.

DETAILED DESCRIPTION

In an example system that randomly samples from a dynamically changing pool, there may exists 10,000 elements that are potentially available, at different points in time, for random sampling operations. Due to constraints that depend upon the nature of the problem served by the random sampling, a subset of the elements actually available for random sampling may be continuously changing. In response to these changes, subsets of the elements may be dynamically excluded from the random sampling pool and also added back in after being excluded from the pool for a number of sampling operations.

If, in the above example, the 10,000 elements were maintained as an array, a dynamic update to the array to exclude a single element may entail removing the single element from the array and shifting all other elements over by one index such that the remaining available elements span a continuous range of indices that may be sampled. For example, an element S2 may be removed from an array [S1, S2, S3 .... Sn] by deleting S2 and shifting all elements with indices higher than S2 over to the left by one index, resulting in [S1, S3 .... Sn-1]. In this case, the processing-intensity of the element exclusion operation scales with the size of the array—in the worst case, by "n" moves (where n is the size of the array) and in the average case by n/2 moves. When dealing with very large arrays having thousands or millions of elements, very large numbers of sampling operations, and large numbers of exclusion/inclusion update operations, it can become computationally expensive, in terms of both time and processing resources consumed to support random-sampling via the above-described methodology.

According to one implementation, the disclosed technology provides low-cost, resource-efficient methods for dynamically adjusting contents of a random sampling pool to include or exclude select elements, such as in response to element-specific trigger events. The proposed methodology provides operations that effectively change the subset of elements available for random sampling without requiring large numbers of array position "shifts" that scale with the size (n) of the array as described above. Rather, the techniques described herein may be implemented with substantially constant time and resource consumption regardless of the size of the array(s) being sampled. These techniques thereby significantly reduce the computational cost (resources consumed and/or execution time) of solving the above-described sampling problem that may arise in a variety of different contexts.

Figure 1:
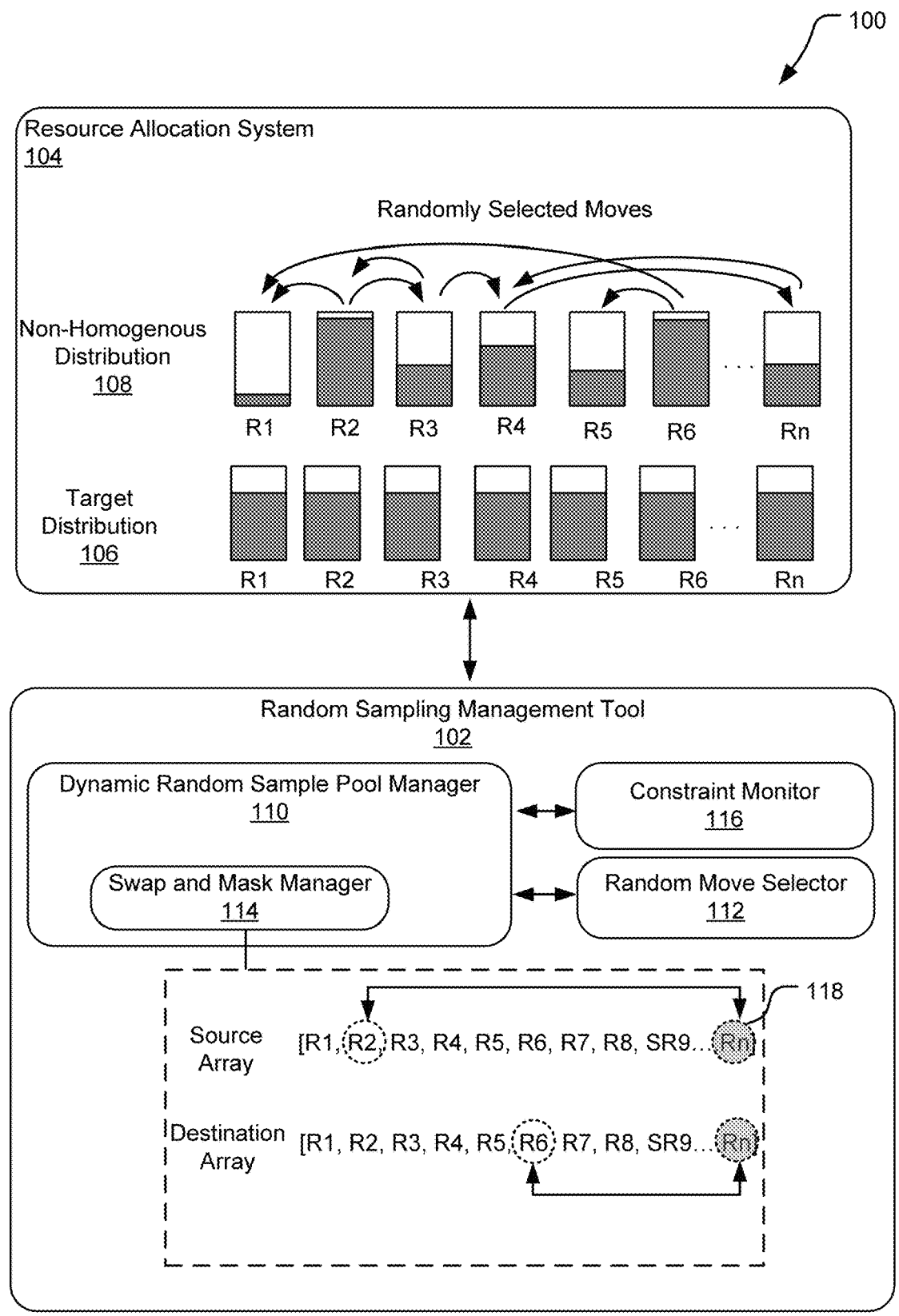
FIG. 1 illustrates an example system that uses a random sampling management tool to effect cost-efficient random sampling from a dynamically-changing sampling pool.

FIG. 1 illustrates an example system 100 that includes a random sampling management tool 102 that performs cost-efficient random sampling from a dynamically-changing sampling pool. The nature of the problem solved by the random sampling management tool 102 may arise in a variety of different contexts and in systems that serve a variety of different purposes. By example, FIG. 1 illustrates a scenario where the random sampling management tool 102 performs random sampling to further the goal of achieving a homogenous distribution of data across various resources (R1 through Rn) in a resource allocation system 104. The resources R1 through Rn may be understood as processing resources, storage resources, or a combination thereof.

The resource allocation system 104 performs ongoing data migration actions to spread data of the resource allocation system 104 more homogenously across the resources R1 through Rn. For example, data migration actions may be designed to shift a current distribution of data (e.g., non-homogeneous distribution 108) toward a target distribution 106 in which data is spread across available resources such that each resource has an approximately equal amount of free resource availability. For example, the target distribution 106 may represent a scenario where CPU usage is capped below 75% on all resources or where free data storage capacity is at or above 20%. A non-homogenous distribution 108 represents another example data distribution across the resources at given point in time.

The goal of achieving relatively homogenous use of the various resources R1-Rn may be further complicated by system-defined limits on how data may be moved around. Imagine, for example, a system-wide constraint requiring that data be moved in predefined quantized units. For example, it may be required that data be moved exclusively in units of a particular size, such as 5 gigabytes (GB). In a more complex system, logical storage space may be organized into discrete units of multiple sizes, such as 5 GB, 10 GB, 20 GB, where data within each different type of data unit must be moved together. For example, it may be prohibited to split a 20 GB unit into units of 5 GB or 10 GB; rather, all 20 GB is required to be moved as a single unit between the different resources R1 through Rn. In this example, some moves of these quantized units of data may serve to increase the homogeneity of the data distribution among the resources while other moves may decrease the homogeneity. It can be imagined that in some cases, one or more moves may each individually worsen (decrease) the homogeneity and yet, collectively (e.g., a series of such moves) may serve to make available one or more additional moves that allow for a net increase in the homogeneity of the distribution.

This problem can be described as one of cost minimization where "cost" refers to resource consumption and the goal is to mitigate the consumption of resources in the resource allocation system. To consider this cost minimization problem, a flat cost may be assigned to the state of data distribution at any given point in time. For example, a suitable cost metric could be constructed so as to provide a computed cost value that decreases in proportion to the relative homogeneity of the data distribution (e.g., decrease as the distribution trends toward the target distribution 106) and such that the computed cost value increases as the distribution gets increasingly less homogenous. Using such a cost metric, the resource allocation system 104 may seek to increase the homogeneity of the data distributions among the resources (R1 through Rn) by identifying a series of moves of the quantized units of data that reduce the overall cost.

Under one approach referred to herein as an "exploitative mode," the resource allocation system 104 attempts to identify individual moves that decrease total cost. For example, a move to migrate 5 TB of data away from R2 to either R3 or R1 serves to further homogeneity of the non-homogenous distribution 108, which equates to a decrease the system "cost" per the definition of cost set forth above. Individual moves that further the homogeneity of the data distribution are referred to herein as "exploitative moves." Under another approach referred to herein as an "explorative mode," the resource allocation system 104 explores potential moves that may individually increase cost in an effort to identify new available moves that lead to a net decrease in cost. For example, it may be that three or four moves that individually increase cost by a small amount (e.g., by moving small amounts of data) make available a large move that provides a significant decrease in cost. These types of moves that may individually increase cost but collectively reveal a move that provides a net decrease in cost are referred to herein as "explorative moves."

According to one implementation, the resource allocation system 104 identifies the above described "moves" by performing random sampling operations to select data source and data destinations for various migrations. In this system, the end goal is to identify moves that improve the homogeneity of the data distribution among resources. In one implementation, the resource allocation system 104 utilizes Monte Carol Markov Chain sampling and conducts different trials filled with random sampling moves among the resources (e.g., R1 through Rn) within a random sampling pool. For example, a randomly-sampled move may include a randomly-sampled data source from the resources R1 through Rn and a randomly-sampled data destination from the resources R1 through Rn. Each trial may, for example, accept a pre-determined number of explorative moves in order to "explore" and afterward, moves that fail to improve the homogeneity of system may be rejected. Explorative moves may be reversed in cases where such moves do not lead to the identification of a global optimum.

While this type of random sampling is a powerful tool for solving the above type of problem, there are some inefficiencies that arise by solving the above problem with a completely random sampling tool that does not utilize any a priori information about the data being moved or the resources R1-Rn. For example, one resource may have low (e.g., insufficient) available storage capacity and therefore be very costly if randomly selected as a destination to receive data. Likewise, another resource may have a high degree of available capacity, making the resource a costly choice as a source to provide data for transferring elsewhere (e.g., because homogeneity of the data distribution would not be improved by such a move). Due these and other considerations, it may be practical for the resource allocation system 104 to implement constraints that, when violated by a given resource, provide for dynamic exclusion of the resource from one or more random sampling pools (e.g., to prohibit a resource from being select as a data source, data destination, or both).

There are multiple ways to implement constraints in the above-described type of system. For example, the constraints may be applied either before or after the random sampling is performed. If the constraints are applied after the random sampling, there is no need to dynamically change any characteristics of the random sampling pool. Rather, the system can simply "check" to see whether each randomly-sampled move violates one or more of the constraints before implementing the move and, if the move violates a constraint, disregard the move (e.g., the same treatment as described above with respect to moves that fail to lower the cost). In systems with a large number of constraints and/or a large number of resources that frequently toggle between unavailable and available for random selection per the constraints, it becomes very inefficient to check the constraints after the sampling is performed.

Another option is to apply the constraints before sampling by removing unavailable resources (that violate one or more of the constraints) from the random sampling pool of sources and destinations for each move. However, it can be very computationally expensive to dynamically redefine contents of a random sampling pool to exclude and re-include various resources. The herein disclosed technology provides an efficient solution to this problem.

In the system 100, the resource allocation system 104 utilizes a random sampling management tool 102 to sample from one or more rapidly-changing sampling pools in a computationally inexpensive way. In advance of each sampling operation, the random sampling management tool 102 evaluates various constraints to determine which resources are available for sampling and, based on this evaluation, dynamically alters contents within one or more sampling pools by applying low-computational-cost operations referred to herein as "swap and mask" operations.

The dynamic random sample pool manager 110 manages a data structure that represents a pool of elements potentially available for random sampling at various points in time. According to one implementation, the data structure includes one or more arrays. For example, the random sampling management tool 102 of FIG. 1 may manage a source array and a destination array. A random move selector 112 randomly samples, for each data migration, a source from the source array and a destination from the destination array. The sampled source provides the data that is to be moved while the sampled destination receives the data from the sampled source.

After selecting the source and destination for a move as described above, the random sampling management tool 102 may, in some implementations, perform yet another random sampling operation to select a data chunk to migrate after the source is selected. In some implementations, moves are supported for multiple different sizes of data chunks (e.g., 1 TB, 5 TB). Other systems may support moves for data chunks of a single size and/or individual resources may impose limits on the sizes of data chunks they can send or receive. In one implementation of the system 100, selecting each "move" entails randomly selecting a data source, randomly selecting a data destination, and randomly selecting a data chunk for migration from the data destination. For example, the data chunk that is to be migrated may be selected by indexing available data chunks on the selected source and by randomly selecting one of the indexed data chunks according to some predefined probability distribution (e.g., data chunks may be selected with equal probability, with weighted probability based on their respective sizes, or other considerations).

The above-described types of random sampling operations can all be managed using techniques the same or similar to those described below with respect to the dynamic random sample pool manager 110. Since these techniques may be similarly applied with respect to different dynamic sampling pools, a single sampling operation is described below with respect to a single sampling pool.

The dynamic random sample pool manager 110 includes a swap and mask manager 114 and a constraint monitor 116 that work together to alter the contents of a random sampling pool (e.g., a data source pool, a data destination pool, or a data chunk selection pool). Prior to each sampling operation, the constraint monitor 116 dynamically determines whether each item the sampling pool has characteristics that violate a predefined constraint. For example, a first predefined constraint may provide that a resource is unavailable for selection as a data source if storing less than a threshold quantity or capacity of data and a second predefined constraint may provide that a resource is unavailable for selection as a data destination if storing more than a threshold quantity or capacity of data. When it is determined that one of the items the sampling pool violates a given constraint, the swap and mask manager 114 performs actions to "mask" the item to effectively remove the item from the g sampling pool until such time that the item no longer violates the constraint. Likewise, when it is determined that one of the items is re-available for random selection (no longer violating a constraint) after being masked for a period of time, the swap and mask manager 114 removes the mask to add the item back into the sampling pool.

In one implementation, an array includes all elements that may, at various times, become available for sampling in the sampling pool. Elements that are available at a given point in time are unmasked while other, unavailable elements are masked. The unmasked elements are arranged contiguously such that the unmasked elements span a continuous range of indices that is a subset of the array. The swap and mask manager 114 selectively masks an element from the sampling pool by swapping the array index of the element with another still-available (unmasked) element located at a boundary of the sampling pool. For example, R2 may be swapped with Rn if/when R2 becomes unavailable as a source for a randomly-selected move. The new index of the unavailable element is dynamically hidden by applying a mask 118, which is effectively applied by reducing a length of the index range corresponding to the sampling pool. This is described in greater detail with respect to the following figures.

When an unavailable element becomes re-available for random sampling (as determined by the constraint monitor 116), the swap and mask manager 114 re-includes such elements, which may include swapping operation(s) and adjusting the mask by increasing a length of the index range corresponding to the sampling pool to re-include such elements. This methodology ensures that each element can be added or removed from the sampling pool at a substantially constant compute time (e.g., within +/−5% time deviation) regardless of the size of the random sampling pool, the rate at which contents of the pool are dynamically changed, or the number of sampling operations.

Further examples of the above are discussed with respect to the following figures.

Figure 2A:
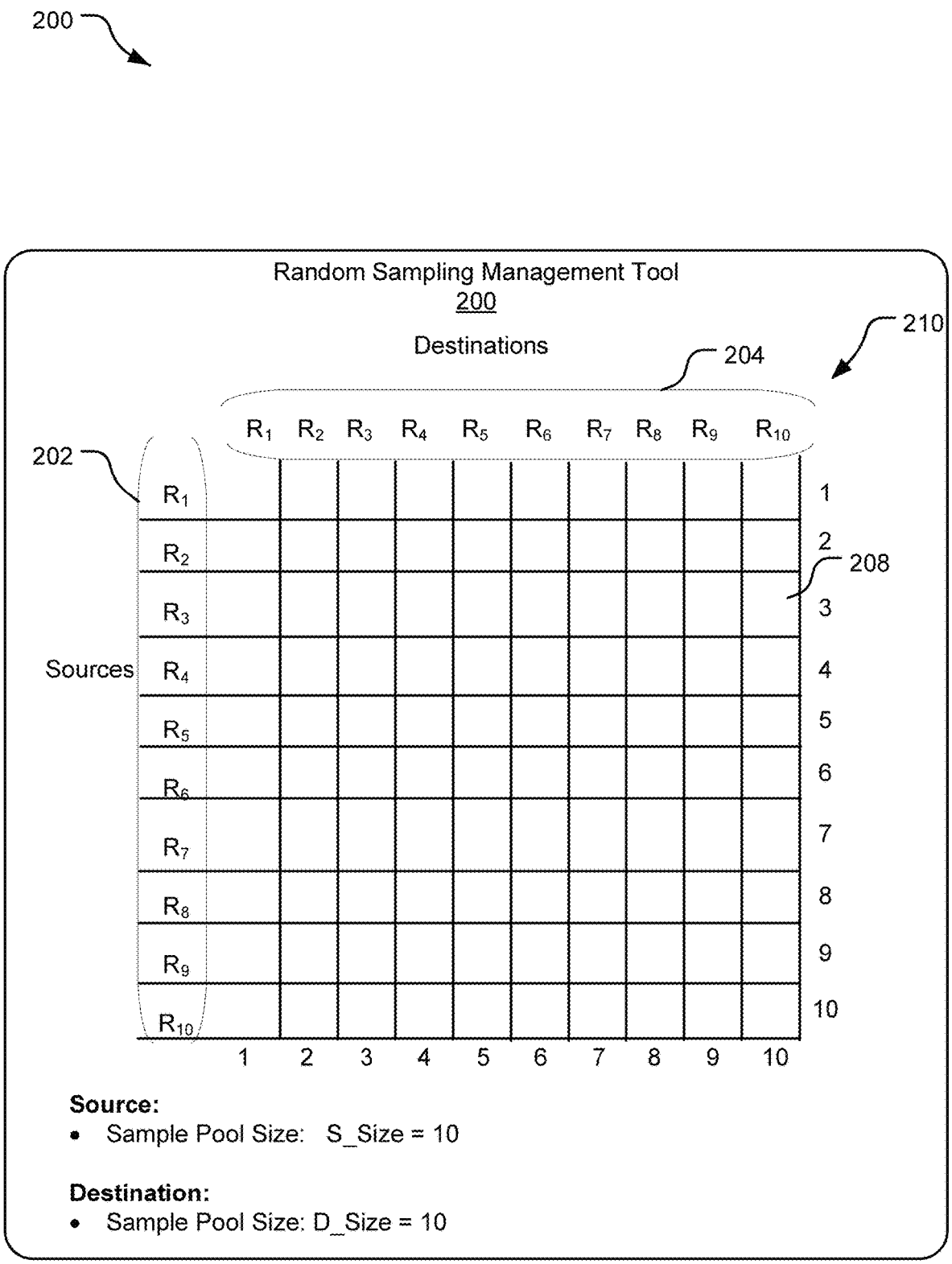
FIG. 2A illustrates aspects of an example system that provides cost-efficient repeated random sampling from a dynamically-changing pool of elements.

FIG. 2A illustrates aspects of a random sampling management tool 200 that performs sampling operation from a dynamically changing sample pool using a methodology that ensures substantially constant compute cost regardless of the size of the sample pool. The random sampling management tool 102 selects random "moves" (migrations of data) by performing random sampling operations. In one implementation, a move is defined by at least two random sampling operations. A first random sampling operation selects a data source from a group of resources available to provide data while a second random sampling operations selects a data destination available to receive the data. Whether or not a resource is included in a sampling pool for a random sampling operation (e.g., to act as either a data source or a data destinations) depends, at a given point in time, on properties of the resource and whether or not those properties violate predefined system constraint(s). For example, a resource may be prohibited from serving as a data source if it is offline due to mechanical issues or if there is very little data residing on the resource (e.g., below a set minimum). Likewise, a resource may be prohibited from serving as a data destination if it has no available capacity to receive data or if the quantity of data residing at the resource exceeds a predefined maximum.

In the example of FIG. 2A, the random sampling management tool 200 randomly samples from a first array 202 and from a second array 204. The first array includes items representing resources that may act as data sources for potential migrations while the second array 204 includes items representing resources that may act as data destinations for such migrations. By randomly sampling from the first array 202 and the second array 204, the system effectively selects a source resource and a destination resource for each data migration.

For illustrative purposes, elements in the first array 202 are shown vertically distributed along a y-axis of a chart 210 and elements in the second array 204 are shown horizontally distributed along the x-axis of the chart.

Empty boxes (e.g., an empty box 208) in the chart represent moves available for random sampling, each move being associated with a randomly-sampled source and a randomly-sampled destination. To simplify the example of FIG. 2A-2E, the first array 202 and the second array 204 are assumed to be of the same size and are depicted to include 10 elements. It is also assumed that the source array and the destination array include the same elements (e.g., the same pool of resources), such that any destination may be chosen for selection with any source. In this scenario, it is assumed that a move is thrown away when the randomly sampled destination equals the randomly-sampled source.

In actual implementations, the array(s) that are randomly sampled from may include thousands of elements that differ in size from one another and/or that impose constraints on which types of randomly-sampled elements can be sampled together. For example, it may be that some destinations (e.g., R3, R7 . . . . R9) are available exclusively in combination with certain sources or vice versa. However, the sample pool management techniques (e.g., "swap" and "mask/unmask" operations) described herein are equally applicable in these more complex systems as well.

To further simplify the example of FIG. 2A-2E, the first array 202 and the second array 204 are numbered to have indices ranging from 1-10 (rather than starting from zero as is typical in computer-managed arrays). While selection of the indexing scheme is an arbitrary choice, using 1-10 in the illustrated example may be conceptually helpful because the array indices then correspond to the source/destination names in the first array 202 and the second array 204. In FIG. 2A-2E, a variable S_Size represents a current effective sample space size and defines a range of continuous of indices in the first array 202 that may be sampled from. At any given time, this sampling pool of data sources consists of the unmasked elements in the first array 202.

Likewise, a variable D_Size represents a current effective sample space size and defines a range of continuous of indices in the second array 204 that may be sampled from. At any given time, this sampling pool of data destinations consists of the unmasked elements in the second array 204.

In this example, S_Size is initialized to be equal to the size of the first array 202 (e.g., 10 elements). Likewise, D_Size is initialized to be equal to the size of the second array 204 (e.g., 10 elements). Consequently, random sampling from the first array 202 is performed by sampling an index between 1 and S_Size while random sampling from the second array 204 is performed by sampling an index between 1 and D_Size (likewise, this sampling could be from 0 to S_Size minus 1 and 0 to D_Size minus 1 or other equivalent indexing scheme).

Figure 2B:
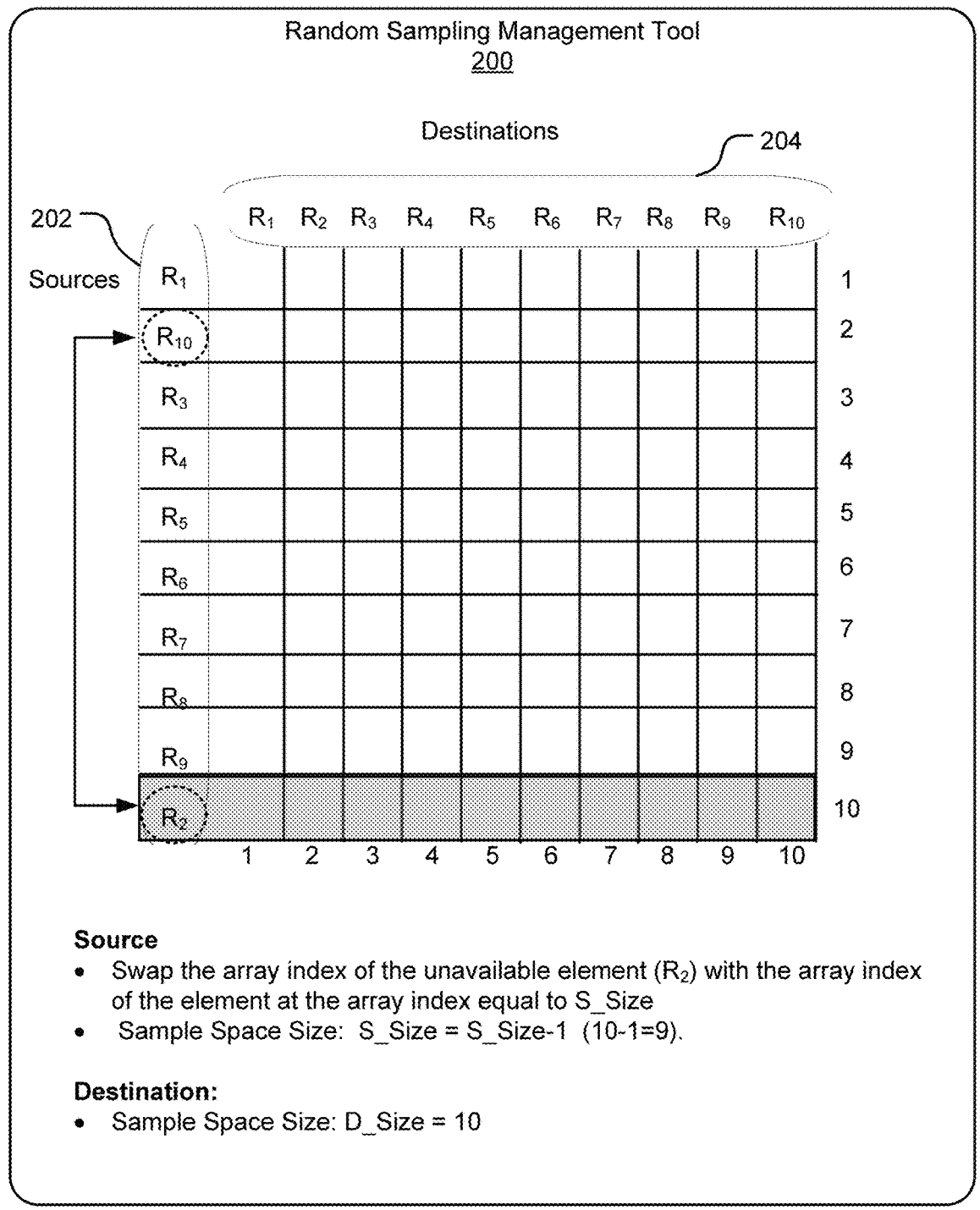
FIG. 2B illustrates a first example action performed by the system of FIG. 2A for efficiently managing a dynamically-changing random sampling pool during random sampling operations.

FIG. 2B illustrates a first example action performed by the random sampling management tool 200 in the example system described with respect to FIG. 2A. Here, a constraint monitor (not shown) has detected an element-specific trigger indicating that a resource R2 is temporarily unavailable as a source (e.g., within the first array 202) for random sampling operations. In this case, the random sampling management tool 200 identifies R2 as an "exclusion element" and performs swap and mask actions to temporarily remove R2 from the random sampling pool that is performed with respect to the first array 202.

Specifically, the random sampling management tool 200 swaps an array index (1) of the exclusion element (R2) with an array index (1) of a highest-indexed unmasked element (R9) in the first array 202. Following this, the random sampling management tool 200 effectively masks the exclusion element (R2) at the new array index by decrementing the sample space size (S-Size), which defines the range of indices in the first array 202 that are randomly sampled from. Specifically, the random sampling management tool 200 decrements the sample space size by 1 (e.g., S_Size=S_Size−1). Because the initial size was 10 in the example of FIG. 2A, S_Size now equals 9. The dynamic random sample pool manager continues to allow random sampling of the elements at indices ranging from 1 to S_Size. However, as S_Size has decreased by one, the identified exclusion element effectively (R2) resides at index 10 and is now effectively "masked" from the random sampling operations (e.g., is unavailable for the random sampling).

Figure 2C:
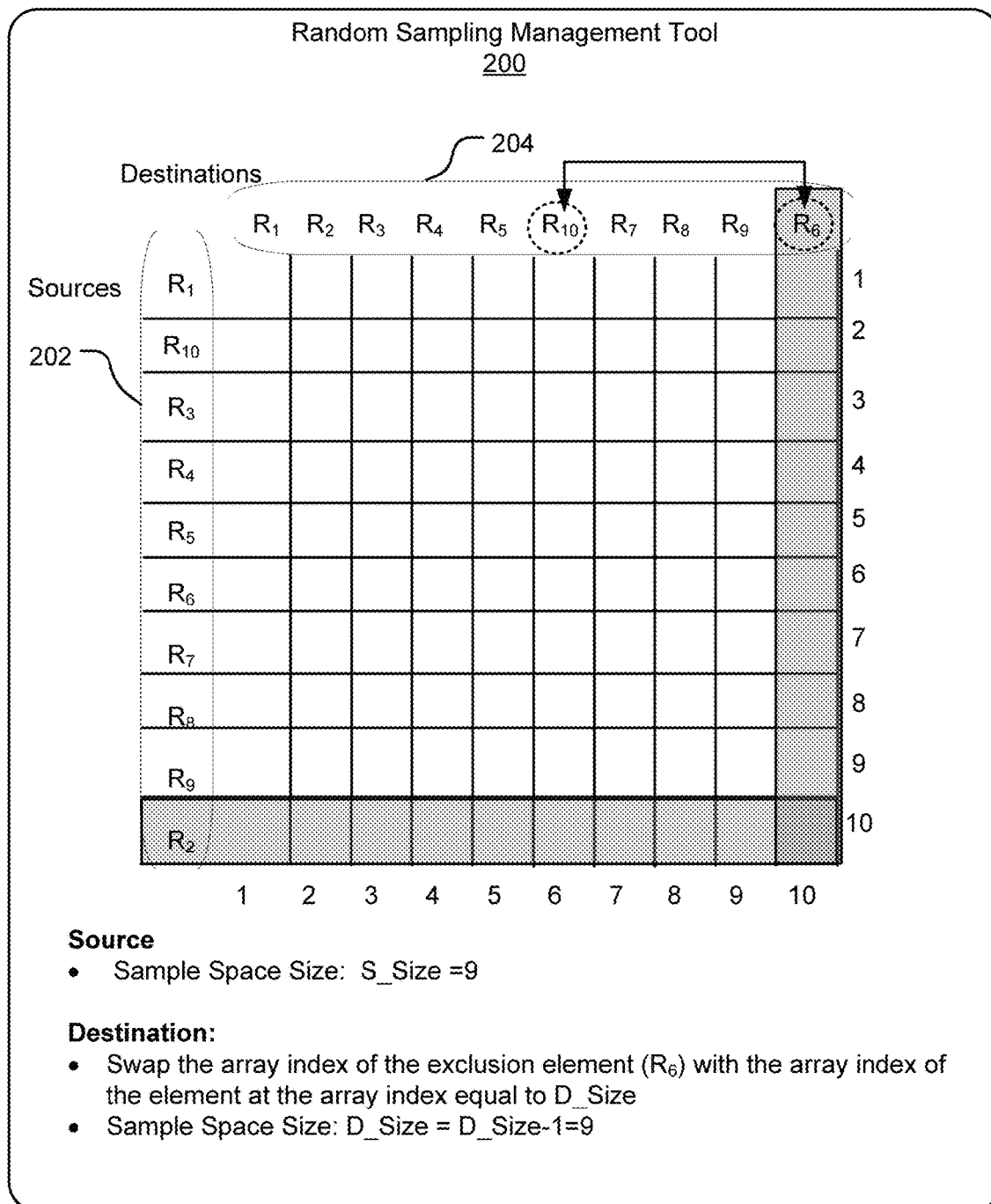
FIG. 2C illustrates a second example action performed by the system of FIG. 2A-B for efficiently managing a dynamically-changing random sampling pool during random sampling operations.

FIG. 2C illustrates a second example action performed with respect to the random sampling management tool 200 in the example system described with respect to FIG. 2A-2B. Here, the constraint monitor (not shown) detects an element-specific trigger indicating that a resource R6 is temporarily unavailable as a destination (e.g., within the second array 204) for random sampling operations. Thus, R6 is identified as an exclusion element and actions are taken to temporarily remove R6 from the random sampling pool that is performed with respect to the second array 204.

Specifically, the random sampling management tool 200 swaps an array index (6) of the exclusion element (R6) with an array index (10) of a highest-indexed unmasked element (R10) in the second array 204. Following this, the random sampling management tool 200 effectively masks the exclusion element (R6) at the new array index by decrementing the corresponding sample space size (D_Size=D_Size−1), which defines the range of indices in the second array 204 that are randomly sampled from.

The dynamic random sample pool manager continues to allow random sampling of the elements at indices ranging from 1 to D_Size. However, because D_Size has been decreased by one, the exclusion element (R6) is masked and excluded from the random sampling pool spanning the unmasked elements (1-9).

Figure 2D:
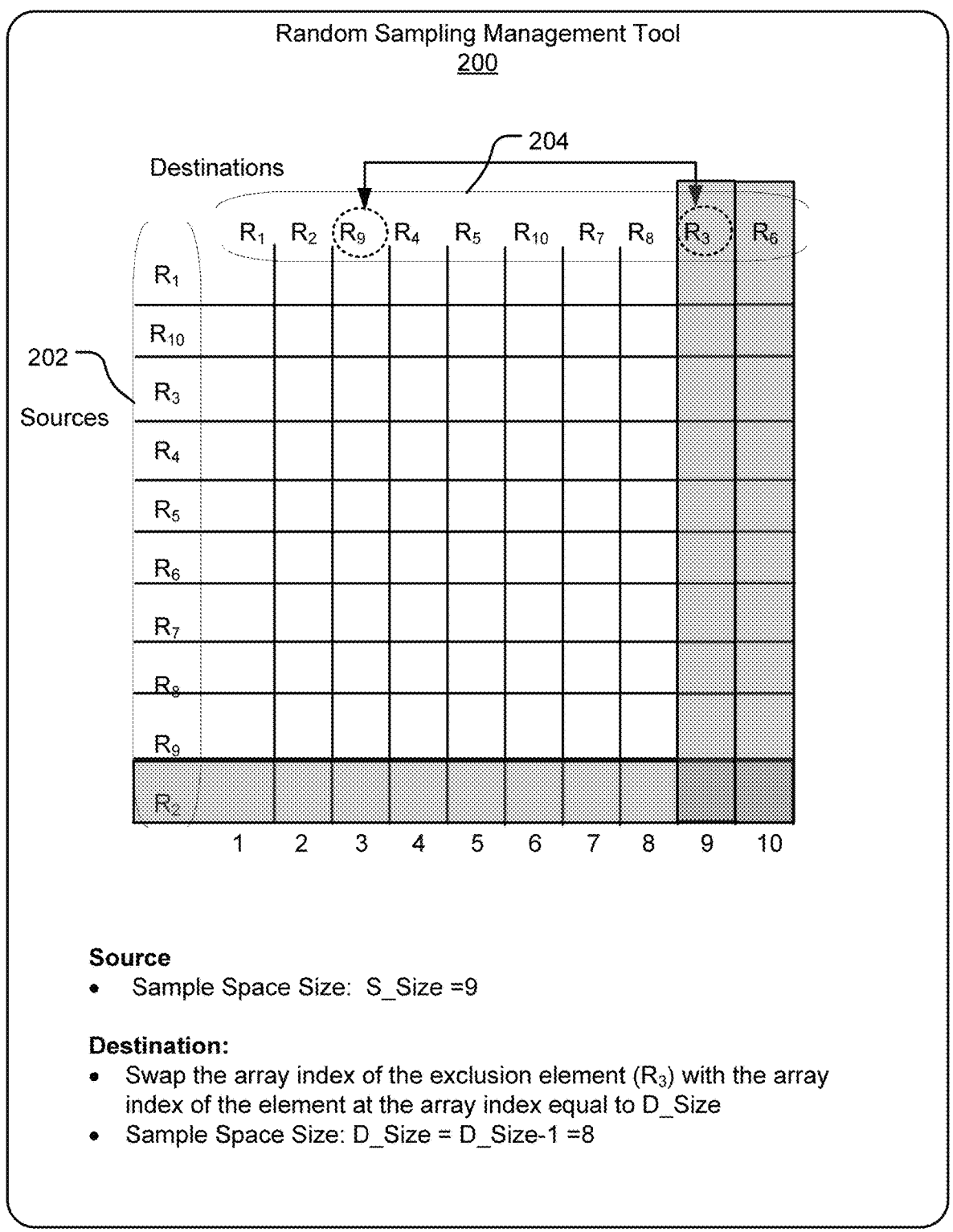
FIG. 2D illustrates a third example action performed by the system of FIG. 2A-2C for efficiently managing a dynamically-changing random sampling pool during random sampling operations.

FIG. 2D illustrates a third example action performed with respect to the random sampling management tool 200 in the example system described with respect to FIG. 2A-2C. Here, the constraint monitor (not shown) has now detected an element-specific trigger indicating that a resource R3 is temporarily unavailable as a destination (e.g., within the second array 204) for random sampling operations. Thus, R3 is identified as an exclusion element and actions are taken to temporarily remove R3 from the random sampling pool that is performed with respect to the second array 204.

Specifically, the random sampling management tool 200 swaps an array index (3) of the exclusion element (R3) with an array index (9) of a highest-indexed unmasked element (R9) in the second array 204. At this point in time, the last element (R6) in the second array 204 is already masked array, so the swap move is affected by swapping the array indices of the newly-identified exclusion element (R3) with the index of the last unmasked element in the array (R9). Following this, the random sampling management tool 200 effectively masks the exclusion element (R3) at the new position by decrementing the corresponding sample space size (D_Size=D_Size−1), further reducing D_Size from 9 to 8 such that the sample pool now spans the first 8 indices of the array. The random sampling management tool 200 continues to allow random sampling of the elements at indices ranging from 1 to D_Size.

Figure 2E:
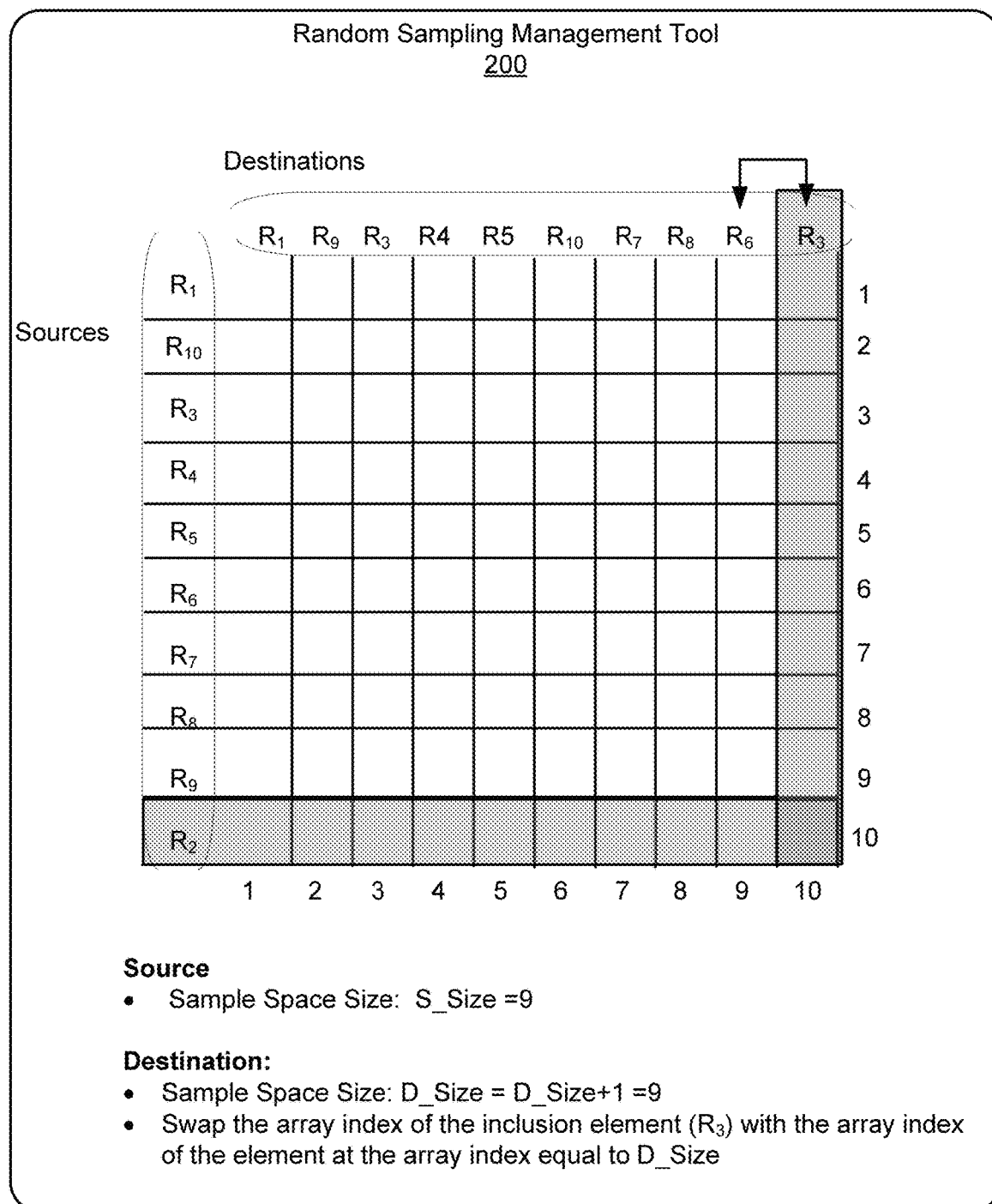
FIG. 2E illustrates a fourth example action performed by the system of FIG. 2A for efficiently managing a dynamically-changing random sampling pool during random sampling operations.

FIG. 2E illustrates a fourth example action performed with respect to the dynamic random sample pool for efficiently managing a dynamically-changing random sampling pool following the example actions of FIG. 2B-2D. Here, the constraint monitor (not shown) has now detected an element-specific trigger indicating that a resource R6 is again available as a destination after being unavailable for a period of time. For example, it is no longer considered costly to migrate data to R6 (e.g., perhaps because storage space or RAM has been freed up on R6). Thus, R6 is identified as an inclusion element (e.g., an element to be re-added to the destination sampling pool within the second array 204 after being excluded during a number of previous sampling operations from the second array 204). Consequently, the random sampling management tool 200 responds by taking actions that effectively reverse (un-do) the previous swap and mask operations pertaining to the element R6 with respect to the second array 204. As used herein, "reversing" or "undoing" one or more swap or mask operations refers to operations that are effective to re-include a masked element in the sampling pool that consists of unmasked elements. Depending on the location of the masked element, reversing a swap and mask operation may entail a single unmask operation (e.g., if the masked element is the lowest-indexed masked element) or a swap followed by an unmasking operation.

In the illustrated example, the random sampling management tool 200 adds the inclusion element R6 back into the destination sampling pool by (1) ensuring the current array index of the inclusion element R6 corresponds to the lowest-indexed masked element, which may include a swapping operation, and (2) unmasking an element at the array index (9) corresponding to a lowest-indexed masked element (R6) of the second array 204, such as by incrementing the sample space size. With reference back to FIG. 2D, the lowest indexed masked element in the second array 204 is R3, which resides at the second-to-last array index. Therefore, the unmasking operation (1, above) is achieved by the ensuring operation (1, above), which includes a swapping operation achieved by swapping the current array index of inclusion element (R6) (e.g., the last index in the second array 204) with the array index of the lowest indexed masked element (e.g., the second-to-last index in the second array 204) as shown by the array in FIG. 2E. The unmasking operation (2, above) is achieved by incrementing the sample space size (e.g., D_Size=D_Size+1) to effectively unmask the second-to-last array index in the second array 204. Because the sample space size D_Size was 8, it is now increased back to 9. Following these operations, the elements in the second array 204 are ordered as shown in FIG. 2E with only the last array index (R3) being masked.

Because random sampling is performed from the pool defined by the sample space size (D_Size) (e.g., from 1 to D_Size), the above operations have the effect of re-adding the inclusion element (R6) in the pool that can be randomly sampled from for selection of the data destination.

Notably, some implementations may provide for adding multiple inclusion elements back into the sampling pool simultaneously (in parallel) by (1) ensuring that the N lowest-indexed masked elements correspond to the N elements being re-added to the sampling pool; and (2) adjusting the mask to unmask the N re-added elements (e.g., increment the sample space size by N). Restoring multiple elements to the sampling pool in a single operation can reduce the number of swaps required, as well as provide other performance benefits.

By performing swap operations and incrementing/decrementing the sample space size variable (S_Size or D_Size) in the above-described way, random sampling can be affected from a dynamically-changing sample pool at a flat computational cost (Big-O notation: O(1)) regardless of the size of the array(s) holding the elements that are randomly sampled. This technique is therefore very powerful in systems that manage very large sample pools that are quickly changing and rapidly being sampled.

Figure 3A:
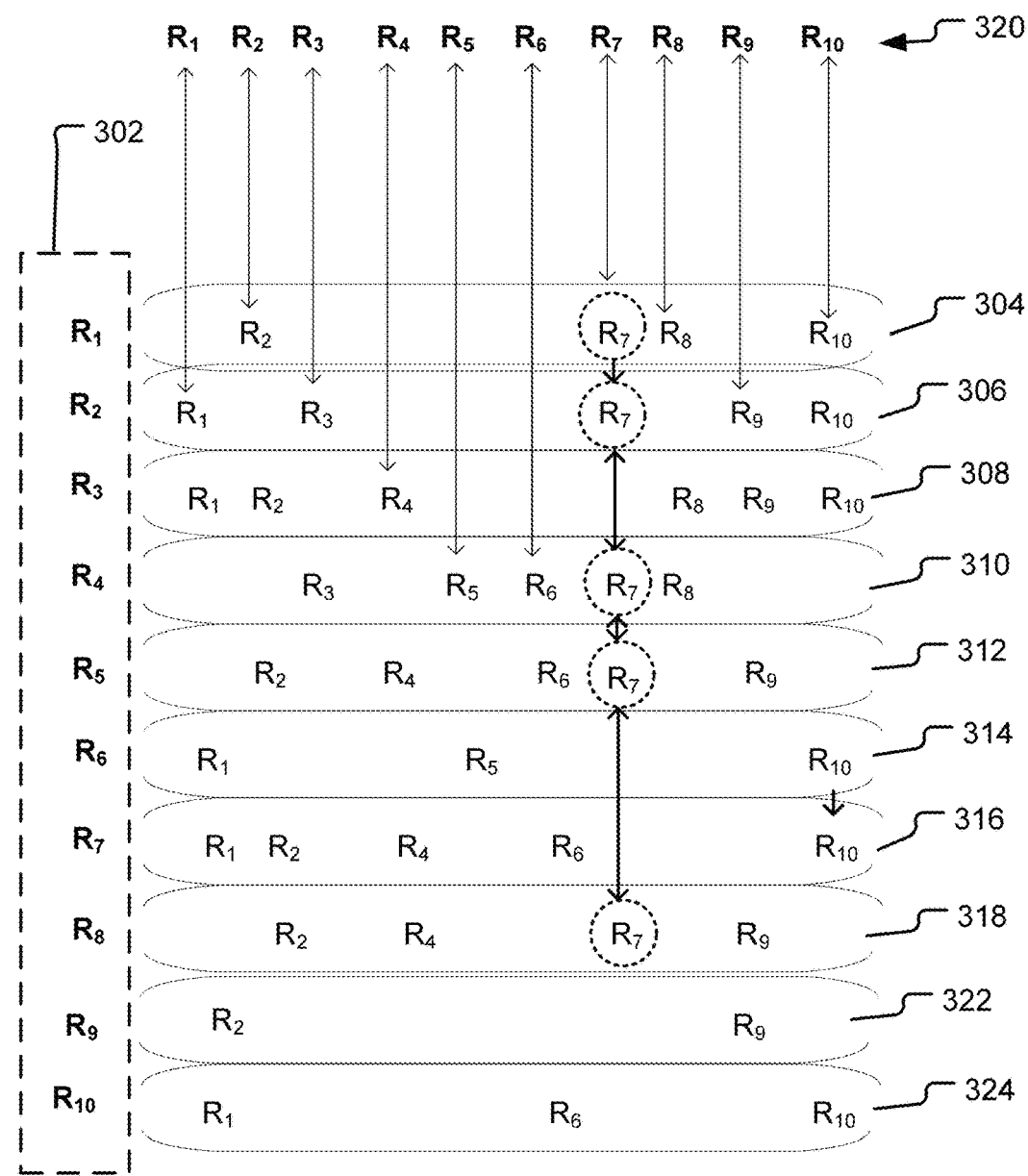
FIG. 3A illustrates aspects of another example system implementing swap and mask operations to manage a dynamically-changing random sample pool.
Figure 3B:
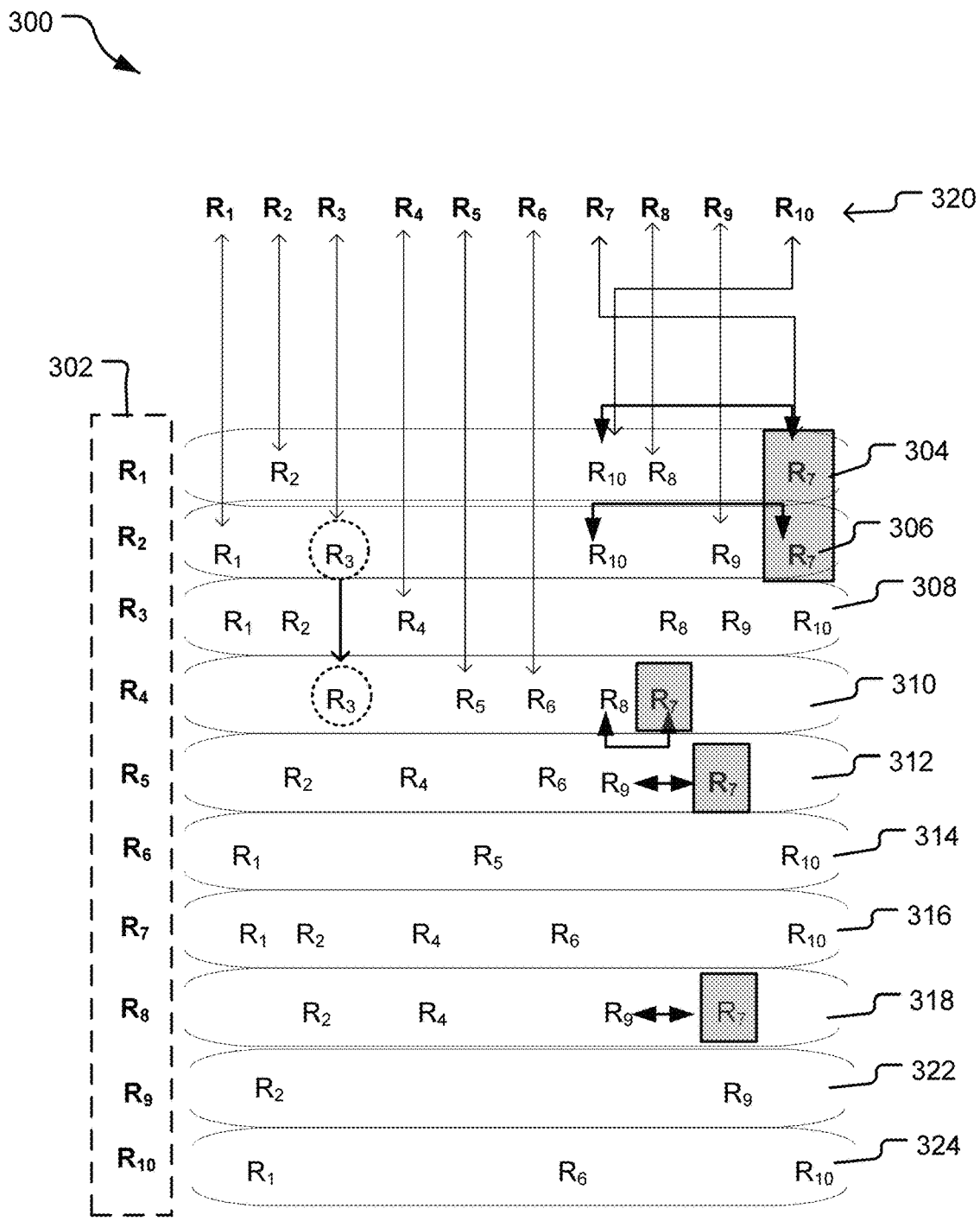
FIG. 3B illustrates an effect of the swap and mask operations described with respect to FIG. 3A.
Figure 3C:
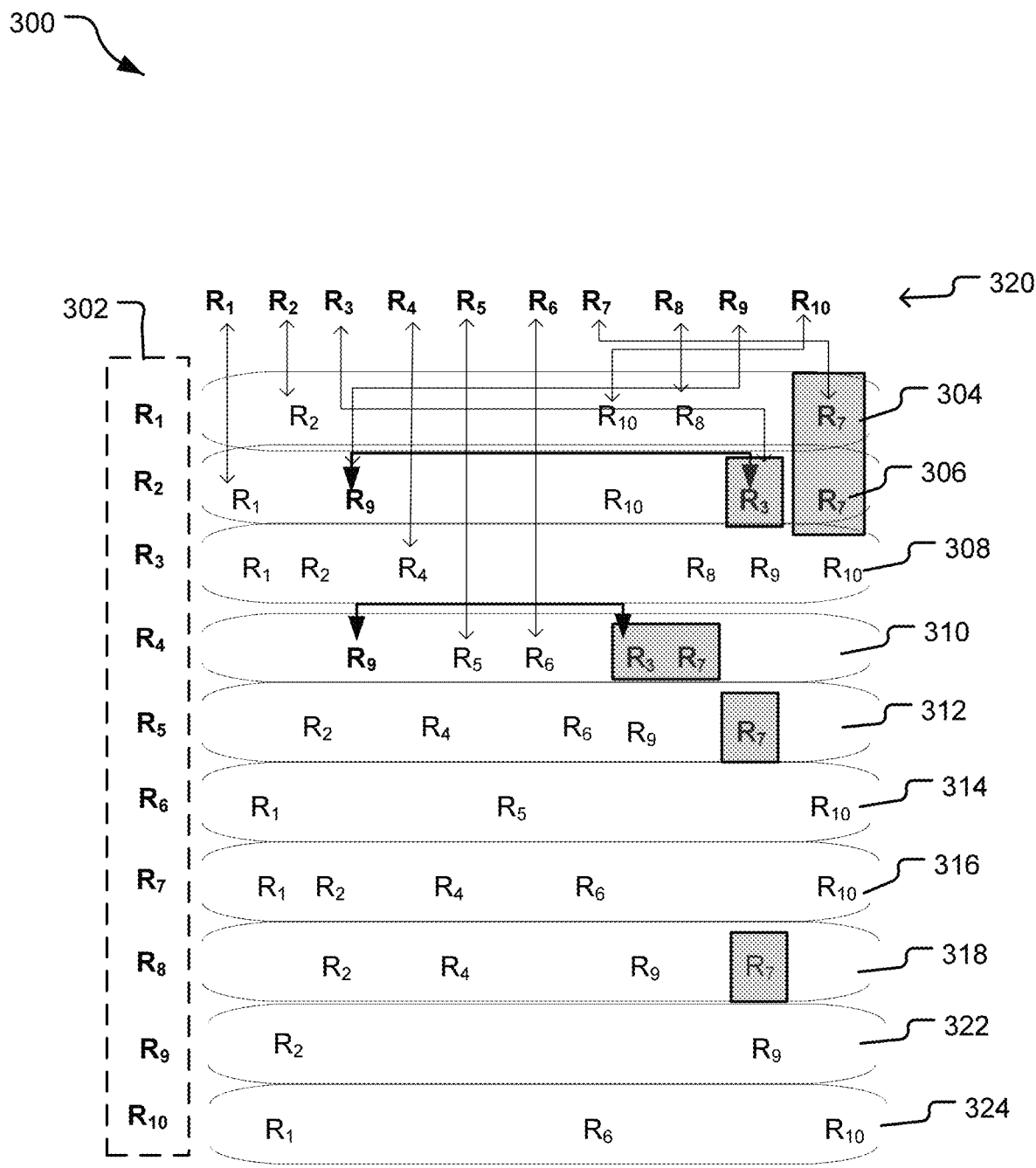
FIG. 3C illustrates an effect of the swap and mask operations described above with respect to FIG. 3B.

FIG. 3A-3C illustrate operations of system 300 that implements random sampling techniques. In one implementation, the system is a resource allocation system that uses random sampling from different pools to identify "moves" (data migrations) that may further the homogeneity of data distribution among a collection of resources, such as in the manner described with respect to the examples of FIGS. 1 and 2A-2E. The examples of FIG. 3A-3C differ from the previous examples in that each element that is available in a source array 302 (storing data sources) is associated with a discrete corresponding array of available destinations (e.g., destination arrays 304, 306, 308, 310, 312, 314, 316, 318, 322, and 324). That is, there exists a first destination array 304 including a subset of data destinations that are potentially available for random selection when a first element R1 is randomly selected as the data source; there exists a second destination array 306 including another, different subset of destinations are potentially available for random selection when a second element R2 is randomly selected as the source, on so on for each different element of the source array 302.

To help illustrate the corresponding sampling techniques, each of the destination arrays 304, 306, 308, 310, 312, 314, 316, 318, 322, and 324 is shown as a row with its respective elements distributed so as to vertically align with like-elements in other rows. For example, the destination array 304 has four elements (R2, R7, R8, and R10), where each element is—for illustrative purposes—vertically aligned (e.g., in the y-axis direction) with other identical elements. Per this view, it is easy to see common elements across the different destination arrays. For example, R2 is included in the destination arrays 304, 308, 312, 316, and 318 but not in destination arrays 306, 310, 314, 322, or 324.

According to one implementation, each different destination within a given destination array (e.g., row-direction array) is represented by a node object that has its own index in the row. The node object has (1) an upward pointer to the nearest-available row above it with the same node object; (2) a downward pointer to the nearest-available row below it with the same node object; and (3) a pointer to a corresponding sampling space size variable (e.g., D_Size) that is specifically managed with respect to the destination array including the node object. For example, destination arrays 304, 306, 308, 310, 312, 314, 316, 318, 322, and 324 each include node objects that include (1) an element identifier; (2) downward and upward pointers to other node objects identifying identical elements, such that the node objects corresponding to a same element collectively include pointers that form linked lists; and (3) information identifying the sampling space for the associated array, where the sampling space is defined as the array plus a size variable describing the number of unmasked elements in the array.

In the example of FIG. 3A-3C, dynamic management of the source array 302 is performed in the same or a similar manner to that described with respect to FIG. 2A-2E. That is, when a given element (e.g., resources R1 through R10) in the source array 302 becomes unavailable for random sampling, the system performs a swap and mask operation to effectively remove the element from the sampling pool. These operations can be dynamically "undone" once the element is again made available for random sampling, as generally described with respect to FIG. 2E.

When a given one of the different resources R1 through R10 becomes unavailable for random sampling as a destination, the operations performed are similar but different in that they are iterative with respect to all of the different destination arrays 304, 306, 308, 310, 312, 314, 316, 318, 322, and 324. If, for example, the element R7 becomes unavailable for random sampling, the system performs a swap and mask operation for each destination array that includes R7, which includes decrementing the D_Size variable in association with each array that includes R7.

In one implementation, the foregoing is achieved by first accessing a dummy array 320 that includes a full list of the destinations collectively included in the various different destination arrays 304, 306, 308, 310, 312, 314, 316, 318, 322, and 324. Each element in the dummy array 320 may, for example, identify a particular element (e.g., R1) and also include a pointer to the first instance of that element in the respective destination arrays. For example, element R1 in the dummy array includes a pointer to the first instance of R1 appearing in the stack of destination arrays. This first instance of R1 is in array 306, as shown. Within the array 306, instance of R1 includes a pointer to a next location of R1 in the stack, which is in 308. The instance of R1 in the array 308 then includes a pointer to the next instance of R1, which is in the array 314, and so forth. These cascading pointers allow for rapid, identical swap/mask updates to an individual element at all of the locations of that element within the stack of destination arrays.

In the case where R7 becomes unavailable, a first instance of R7 within the stack of destination arrays is identified by referencing the dummy array 320 to retrieve the pointer within the R7 that points to the first instance of R7 within the first row (destination array 304). The system then accesses this first instance of R7 within the destination array 304 and performs a swap and mask operation, as described above with respect to the examples of FIG. 2A-2E. That is, for each array including R7, R7 is swapped with the element at the index equal to the sample space size variable for the respective array (e.g., R10) and the sample space variable is then decreased by one.

Following this swap and mask operation, the system updates the upward and downward pointers in other arrays that point to the swapped elements R7 and R10 in the destination array 304 to reflect the new index positions of these swapped elements. For example, the dummy array 320 is updated such that downward pointers within the R7 and R10 nodes respectively point to indices 10 and 7 in the destination array 304 rather than vice versa. Likewise, the upward pointers within R7 and R10 nodes in the destination array 306 are then updated to respectively point to indices 10 and 7 in the destination array 304.

The above operations described with respect to R7 in the destination array 304 are then repeated with respect to each other instance of R7 in the other destination arrays. For example, the downward pointer within the object node of element R7 in the destination array 304 is used to identify the next instance of R7, which is in the destination array 306. In the array 306, the R7 element is swapped with the element at the index equal to the sampling space size for the array 306 and the sampling space size variable is decreased by one. Following the swap, the downward pointers in the row 304 are updated to point to the new indices of the swapped elements and the upward pointers in the destination array 308 are updated to point to the new indices of the swapped elements.

Swap and mask operations may be repeated in this way with respect to each different instance of the unavailable element (R7) using the pointer within each respective object node to identify the next location of the element, until all instances of R7 are masked throughout all of the destination arrays such that R7 is not available for random sampling as a destination with respect to any randomly-selected source.

Notably, the computational cost of the swap and mask operations described above with respect to the destination arrays of FIG. 3A scales with the number of destination arrays (e.g., scaling with O (n), where n is the number of destination arrays). Thus, while this solution is still highly efficient, it is not achieved with the flat computation cost (O (1)) of the swap and mask operations for individual arrays shown in FIG. 2A-2E.

FIG. 3B illustrates an effect of the swap and mask operations described above with respect to FIG. 3A. In the destination array 304, the unavailable element R7 has been swapped with the last element in the array (e.g., the element at the index equal to the sampling space size), and the sampling space size was then decreased by one, effectively "masking" R7 from the random sampling occurring with respect to the destination array 304 due to the fact that such random sampling is performed from in a defined space ranging from the first element in the array to the element at the index equal to the sample space size.

Likewise, within each one of the other destination arrays including the unavailable element R7 (e.g., the destination arrays 306, 310, 312, and 318), the unavailable element R7 has been swapped with the last unmasked element in the array and effectively masked from random sampling as described above (e.g., by decreasing the sampling space size).

Following the above-described operations, the system 300 determines that another element—R3—has become unavailable for random sampling operations. The dummy array 320 is then used to identify the object node identifying R3, which is in the destination array 306. This object node includes a downward pointer to the next object node identifying R3, which is in the destination array 310. Swap and mask operations are then performed with respect to these elements as described above.

FIG. 3C illustrates an effect of the swap and mask operations described above with respect to FIG. 3B. In the destination array 304, the unavailable element R3 has been swapped with the last element in the array (e.g., the element at the index equal to the sampling space size), and the sampling space size was then decreased by one, effectively masking R3 from the random sampling occurring with respect to the destination array 304 due to the fact that such random sampling is performed from in a defined sample space ranging from the array index one to the sample space size (or index 0 to the sample space size minus 1, depending on the chosen convention).

Likewise, within the destination arrays 306 and 310, the unavailable element R3 has been swapped with the last unmasked element in the array and effectively masked from random sampling by decreasing the sampling space size.

It can be appreciated that reverse operations can be implemented to "unmask" either of the masked elements R3 and R7 in the same or similar manner as that described above. That is, the dummy array 320 can be accessed to identify the destination array including the first instance of the element of interest and the sample space size of the identified array can then be increased by 1. Following this, a swap is performed to switch the index of the element of interest with the element at the index equal to the sample space size for within the identified destination array. Downward and upward pointers to the swapped elements are updated to reflect the change, and the downward pointer within the newly-unmasked element now provides the position for the next swap and unmask operation until all destination rows including the element have been updated.

This use of node object pointers to essentially form a "linked list" as described above eliminates the need to go through all rows and "check" for the elements that are to be masked or unmasked, thereby further reducing the computational cost of the operations. Moreover, the aforementioned techniques eliminate the need to use a separate data structure maintaining the indices associated with each element because the nodes themselves include such information.

Figure 4:
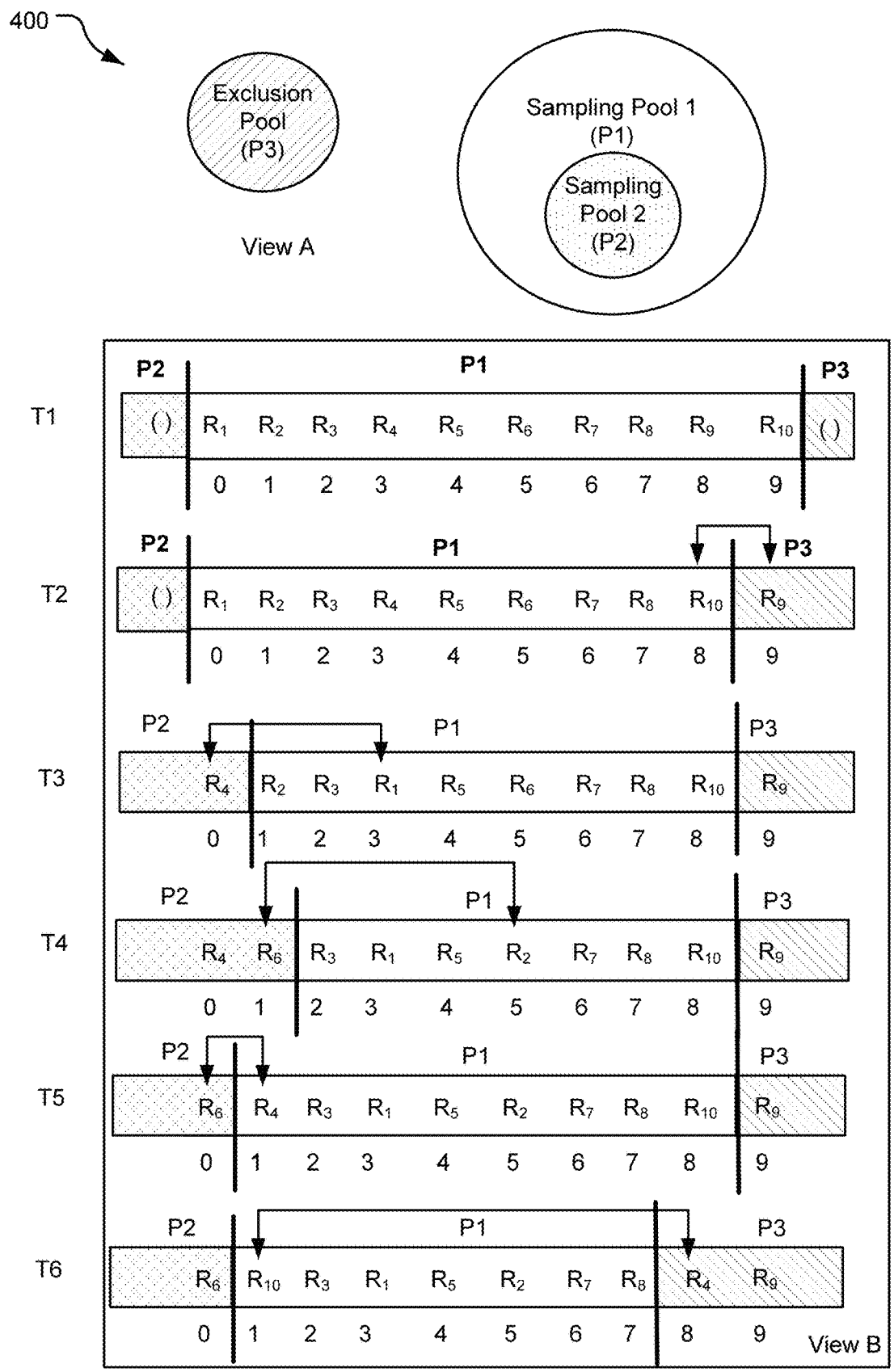
FIG. 4 illustrates yet another system that implements techniques for randomly sampling from a dynamically-changing sampling pool.

FIG. 4 illustrates aspects of yet another system 400 that implements random sampling techniques. For clarity of concept, it is assumed in the following discussion that the system 400 a resource allocation system that uses random sampling from different pools to identify moves that may further the homogeneity of a data distribution among a collection of resources, in a manner consistent with the other exemplary systems utilized herein. It may be appreciated that the below-described sampling techniques are equally applicable to a vast number of other types of systems that perform random sampling.

The system 400 differs from the examples described above in that a same sampling operation may be performed with respect to two different sampling pools depending on a mode of sampling that is currently being performed. For example, data source may be selected from other a first pool or a second pool. Alternatively, a data destination may be selected from a first pool or a second pool.

In this particular example, the system 400 includes a first sampling pool P1 and a second sampling pool P2. The second sampling pool P2 consists of a subset of the items that are also included in the first sampling pool P1.

While the example of FIG. 4 shows the second sampling pool P2 to the left of P1 (with lower indices than P1), P2 could—in other implementations—be located to right of P1 (with indices higher than P1), as the size of both P(1) and P(2) are known. In this case, the sampling operations from P1 are still performed from the size of P1, while sampling operations from P2 are performed from a size offset by (len(P1)−len(P2)).

Random sampling from P1 is a random sampling from all items included in P1 and P2. Random sampling from P2 excludes a collection of items that are in P1 but not in P2. The system 400 is further shown to include an exclusion pool P3, which may be understood as a pool that includes elements that are selectively masked (per the operations described elsewhere herein) and temporarily excluded from sampling operations.

Previously, the discussion of FIG. 1 briefly introduced the concept of "explorative moves" and "exploitative moves" with respect to a resource allocation system that migrates data between resources to further homogeneity of the data distribution. In this type of system, there may be a benefit to defining two different sampling pools for a same type of sampling operation. When, for example, an explorative mode of sampling is enabled, a vast number of moves may be permitted even if those moves do not individually lead to an increase in homogeneity of resource distribution. In contrast, a system operating in an exploitative mode may utilize certain a priori information about the resources to exclude random sampling selections that lead to moves that do not individually increase system homogeneity.

In an example where the system 400 is a resource allocation system consistent with the other examples herein, P1 is a pool of resources and may represent either a source pool or a destination pool. P1 may be understood as encompassing all resources do not violate hard constraints for the given type of selection (source or destination). A hard constraint is, for example, a constraint that disqualifies an item for random selection during a sampling operation regardless of the sampling mode that is enabled (e.g., the item is disqualified for sampling in both the explorative mode and the exploitative mode). Items that violate hard constraints are identified as "exclusion elements" and moved to the exclusion pool P3, such as by swapping and masking elements similar to the techniques described elsewhere herein. For example, a defined hard constraint may provide that a resource cannot be selected as a data source if it is at 0 percent capacity (e.g., it is empty), offline, or for other reasons physically unavailable. In these instances where a resource violates a hard constraint, the resource may be removed from the pool P1 and added to the exclusion pool P3.

P2 may be understood as encompassing the subset of resources in P1 that do not violate soft constraints. A soft constraint is, for example, a constraint that disqualifies the item for random selection when a first mode of sampling is enabled is enabled but not when a second mode of sampling is enabled. When, for example, the system 400 is operating in an explorative mode, the system 400 permits all types of moves to be randomly selected and therefore performs random sampling from P1. In contrast, the system 400 randomly sample from P2 instead of P1 when operating in an exploitative mode. The exploitative mode is designed to permit only a subset of moves that are likely to immediately improve homogeneity of the data distribution (e.g., moves that do not violate defined soft constraints).

In an example where P1 and P2 represent pools for selecting data source (e.g., a source from which data is to be migrated away from), a defined soft constraint may provide for migrating resources from P2 to P1 when available capacity on such resources exceeds 50% or some other threshold. Rationale behind such a constraint may be based on the premise that homogeneity of the data distribution is unlikely to be improved when data is moved away from resources that already have a lot of free capacity. By randomly sampling the data source from P2 and moving resources from P2 to P1 when they have a lot of free capacity, the odds are improved that a randomly sampled move (from a source selected from P2 and a destination selected from another pool) has a higher likelihood of immediately improving homogeneity than a random sampling of the source from P1.

The three pool system of FIG. 4 can be implemented by data objects managed using swap and mask operations similar to other implementations described herein. Consequently, the sampling pools P1 and P2 can be dynamically updated in a processor-efficient manner.

View B illustrates example operations for moving the items between the three different pools P1, P2, and P3 and that enable random selection from any of the pools with substantially constant compute time regardless of the size of the pools or the frequency of sampling operations. Time indices T1, T2, T3, T4, T5 and T6 represent consecutive intervals of time. Thus, within T1, multiple operations may be sequentially performed, but all operations performed in T1 are completed before the commencement of T2. During a first time interval T1, the first sample pool P1 is initialized to include all items. All items are initially unmasked-meaning, there is nothing in the exclusion pool (e.g., P3 is null) and soft constraints have not yet been evaluated so there is also nothing in the second sampling pool P2. A sample space for P1 is defined to include all 10 items, encompassing items in indices 0 through 9. A sample space for P2 is initialized of size 0 (a null array).

During a second time interval, T2, the system 400 evaluates hard constraints and finds that a resource R9 violates a hard constraint and is therefore an exclusion element unavailable for random in all modes of operations. Consequently, the system 400 removes the exclusion element R9 from the first sampling pool P1 by swapping the array index of R9 (e.g., index 8) with an array index at the boundary of P1 (e.g., the array index of a highest-indexed unmasked element in the first sample pool P1 (index 9)), effectively swapping elements R9 and R10 as shown. Subsequently, the exclusion element is masked at the new position (effectively, added to the exclusion pool P3) by reducing the size of the sampling space for P1 so as to encompass indices 0-8 instead of 0-9.

During a third time interval, T3, the system evaluates soft constraints to determine a subset of items in P1 that are to be moved into P2. For example, a soft constraint may specify that the sample pool P2 includes all sources with existing data storage exceeding 80% capacity (e.g., having 20% or fewer available capacity). In this evaluation, it is determined that R4 and R6 satisfy the soft constraint and are therefore to be added to the second sample pool P2 by way of additional swap and mask operations performed in series.

In the illustrated example, T3 shows swap and mask operations that move R4 to the second sample pool P2. This move is achieved by swapping R4 with an element at the boundary of P1—this time, the swap is with the lowest index that is included in P1 but that is also excluded from the subset of elements in P2 (e.g., index 0). R4 is then added to the second sample pool P2 by increasing a size of P2's sample space from 0 to 1, as shown with respect to T3. Thus, P2's sample space includes a single element at index 0. As P2's sample space is progressively incremented with each addition to P2, the associated sampling array grows from indices [0] to indices [0,1], to [0, 1, 2], etc.

Defining the sample space for P2 in this manner may be understood as selectively masking from P2 the portion of P1 corresponding to indices excluded from P2 (e.g., indices 1 through 8 at time T3).

Since, in this example, R6 was also found to violate a soft constraint, R6 is next moved to the second sample pool P2. T4 illustrates swap and mask operations that move R6 to P2. Specifically, R6 is swapped with an element (R2) that is at the lowest index included in P1 excluded from P2 (e.g., index 1, as shown with respect to T4). Following the swap of R6 and R2, the sample space size of P2 that is incremented by 1 so that it now encompasses both of indices 0 and 1, as also shown with respect to T4. Sampling operations from P1 can now be performed by randomly sampling the range of indices corresponding to its sample space size (e.g., 0 through 8) while sampling operations from P2 can be performed by randomly sampling the range of indices corresponding to its sample space size.

Following the evaluation of the soft constraints (e.g., concluding after the operations shown with respect to T4), random sampling may be performed from the sampling pools. In View B of FIG. 4, the additional time intervals T5 and T6 illustrate swap and mask operations that occur during a subsequent round of constraint evaluation (after random sampling is performed at the end of T4). Within the time interval T5, evaluation of the hard constraints leads to identification of R4 as an exclusion element. Here, the move of R4 from the second sampling pool P2 to the exclusion pool P3 is achieved by two sets of swap and mask/unmask operations. Swap and unmask operations are first performed to move R4 from P2 to P1. This entails swapping the elements in indices 0 and 1 and unmasking index 1. During time interval T6, swap and mask operations are next performed to move R4 from P1 to the exclusion pool P3. This entails swapping the elements in indices 1 and 8, and masking index 8 (the final position of R4).

It can be appreciated that any element moved out of P1 and into the exclusion pool P3 can be moved back into P1 as the element again becomes eligible for random sampling (no longer violating the hard constraint(s)). The addition of an element to the random sampling pool P1 can be achieved in the same manner as described with respect to FIGS. 2A-2E and 3A-3C. Likewise, items moves from P1 to P2 can similarly be moved out of P2 and in to P1 by swapping across the P1/P2 boundary and redefining the sample space sizes for P2, as described above. These techniques support dynamic moves of elements between the two sampling pools and the exclusion pool, while still allowing each move and sampling operation to be computed with substantially equal compute time regardless of the size of the sampling pools and the frequency of sampling operations.

It can be appreciated that the techniques described above with respect to the example of FIG. 4 can also be extended to use cases with multiple pools where each pool is a subset of the prior pool. For example, pool A may be a subset of pool B which is a subset of pool C which is a further subset of pool D, where each progressively larger pool (P(n)) implements all constraints of the next-largest pool (P(n-1)), plus optionally adds additional constraints. The computational cost of this technique does scale with the number of sampling pools. When the above example is extended to multiple pools, k, this potentially requires (k-1) times the number of swap and mask operations of the single sampling pool scenario.

Figure 5:
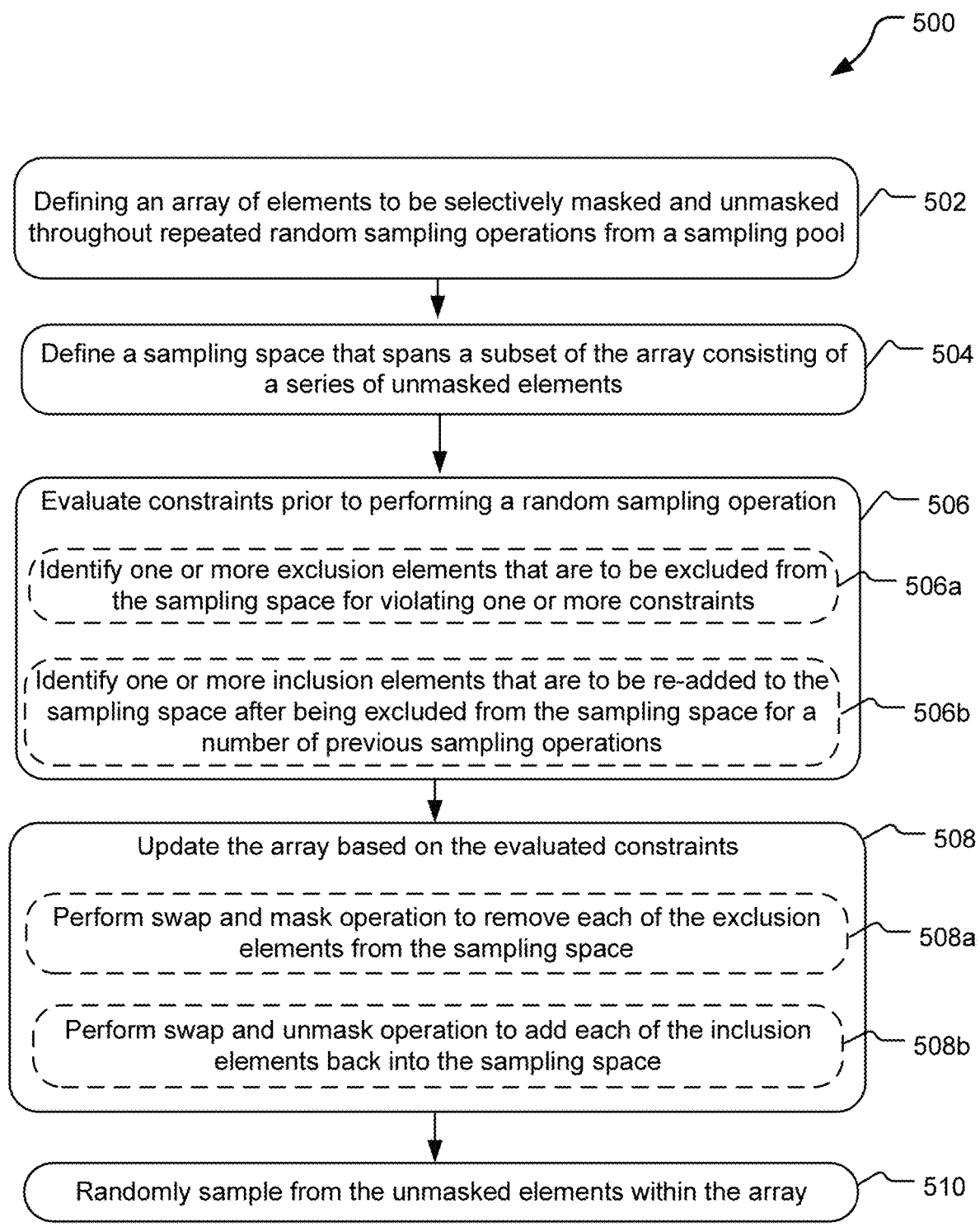
FIG. 5 illustrates operations for cost-efficiently performing repeated random sampling operations from a dynamically-changing sampling pool.

FIG. 5 illustrates example operations 500 for cost-efficiently performing repeated random sampling operations from a dynamically-changing sampling pool. A defining operation 502 defines an array of elements that may be selectively masked and unmasked throughout repeated random sampling operations from a sampling pool. The sampling pool is defined to include the unmasked elements and exclude the masked elements. In one implementation, the sampling pool is a continuous subset of the array. Initially, all elements may be unmasked and the sampling pool spans the entire array.

A constraint evaluation operation 506 evaluates one or more constraints prior to each repeated instance of the sampling operation. The constraint evaluation operation 506 includes optional suboperations 506a and 506b. As described below, these operations provide for identifying one or more exclusion elements and/or inclusion elements, respectfully. Depending on the nature of the constraints evaluated and the characteristics of the individual elements at the time of the constraint evaluation, inclusion element(s) and/or exclusion element(s) may or may not be identified. It is to be appreciated that there is no ordering requirement for suboperations 506a and 506b and these operations may be performed in any order sequentially or in parallel.

In instances where one or more of the elements in the array violate defined constraints, the suboperation 506a identifies one or more exclusion elements. An exclusion element is an unmasked element in the array that is to be excluded from the sampling operation for violating one or more of the evaluated constraints. In instances where one or more elements in the array previously violating constraint(s) is found to no longer be in violation of those constraint(s), the suboperation 506b identifies one or more inclusion elements that are to be included in the sampling operation after being excluded for a number of previous sampling operations. An inclusion element is a masked element in the array that no longer violates any of the evaluated constraints.

A constraint enforcement operation 508 ensures the results of the constraint evaluation operation are applied to the sampling space. The constraint enforcement operation 508 may include one or more swap and mask operations 508a, and may include one or more swap and unmask operations 508b. Operations 508a and 508b may occur in any order relative to each other. For each identified exclusion element, the swap and mask operation 508a removes the identified exclusion elements from the sampling space. In one implementation, each one of the exclusion elements is removed from the sampling space by (1) swapping an array index of the exclusion element with an array index within the sampling pool that is at a boundary of the sampling pool (e.g., the array index of a highest-indexed unmasked element in the array) and (2) subsequently masking the exclusion element at its new position. Operation 508a is optional when 508a identified zero exclusion elements.

For each identified inclusion element, the swap and unmask operation 508b adds the inclusion element back into the sampling space. In one implementation, each one of the inclusion elements is added back into the sampling space by unmasking an element that is external to the sampling pool and directly adjacent to a boundary of the sampling pool (e.g., the array index of the lowest-indexed masked element in the array) and (2) subsequently swapping the array index of the inclusion element with the array index of the unmasked element. Operation 508b is optional when 506b identified zero inclusion elements.

A random sampling operation 512 randomly samples from the unmasked elements within the array.

Figure 6:
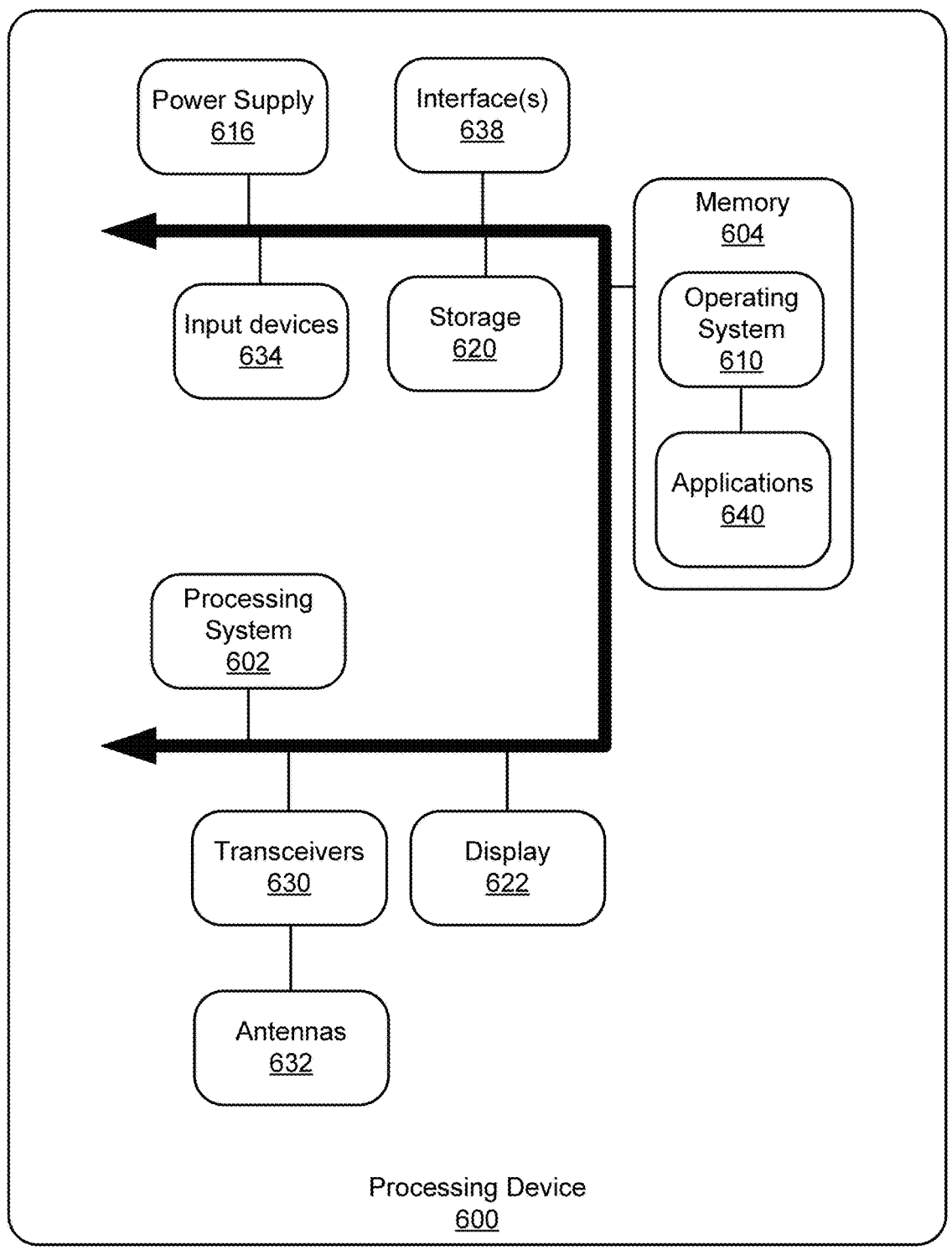
FIG. 6 illustrates an example processing device suitable for implementing aspects of the disclosed technology.

FIG. 6 illustrates an example schematic of a processing device 600 that may be suitable for implementing aspects of the disclosed technology. The processing device 600 includes a processing system 602 (e.g., a CPU and a USB controller), memory 604, a display 622, and other interfaces 638 (e.g., buttons). The memory 604 generally includes both volatile memory (e.g., random access memory (RAM)) and non-volatile memory (e.g., flash memory). An operating system 610, such as the Microsoft Windows® operating system, the Microsoft Windows® Phone operating system or a specific operating system designed for a gaming device, resides in the memory 604 and is executed by the processing system 602, although it should be understood that other operating systems may be employed.

One or more applications 640, such a random sampling management tool 102 of FIG. 1 or a resource allocation system 104 of FIG. 1 are loaded in the memory 604 and executed on the operating system 610 by the processing system 602. Applications 640 may receive input from various input devices 634 such as a microphone, keypad, mouse, stylus, touchpad, joystick, etc. Additionally, the applications 640 may receive input from one or more remote devices, such as remotely-located smart devices, by communicating with such devices over a wired or wireless network using more communication transceivers 630 and an antenna 632 to provide network connectivity (e.g., a mobile phone network, Wi-Fi®, Bluetooth®). The processing device 600 further includes memory storage 620 and a power supply 616, which is powered by one or more batteries and/or other power sources and which provides power to other components of the processing device 600. The power supply 616 may also be connected to an external power source (not shown) that overrides or recharges the built-in batteries or other power sources.

The processing device 600 may include a variety of tangible computer-readable storage media and intangible computer-readable communication signals. Tangible computer-readable storage can be embodied by any available media that can be accessed by the processing system 602 and includes both volatile and nonvolatile storage media, removable and non-removable storage media. Tangible computer-readable storage media excludes intangible and transitory communications signals and includes volatile and nonvolatile, removable and non-removable storage media implemented in any method or technology for storage of information such as computer readable instructions, data structures, program modules or other data. Tangible computer-readable storage media includes RAM, read-only memory (ROM), programmable read-only memory (PROM), erasable programmable read-only memory (EPROM), electrically erasable EPROM (EEPROM), flash memory or other memory technology, CDROM, digital versatile disks (DVD) or other optical disk storage, magnetic cassettes, magnetic tape, magnetic disk storage or other magnetic storage devices, or any other tangible medium which can be used to store the desired information, and which can be accessed by the processing device 600. In contrast to tangible computer-readable storage media, intangible computer-readable communication signals may embody computer readable instructions, data structures, program modules or other data resident in a modulated data signal, such as a carrier wave or other signal transport mechanism. The term "modulated data signal" means a signal that has one or more of its characteristics set or changed in such a manner as to encode information in the signal. By way of example, intangible communication signals include wired media such as a wired network or direct-wired connection, and wireless media such as acoustic, radio frequency (RF), infrared, and other wireless media.

Some implementations may comprise an article of manufacture. An article of manufacture may comprise a tangible storage medium (a memory device) to store logic. Examples of a storage medium may include one or more types of processor-readable storage media capable of storing electronic data, including volatile memory or non-volatile memory, removable or non-removable memory, erasable or non-erasable memory, writeable or re-writeable memory, and so forth. Examples of the logic may include various software elements, such as software components, programs, applications, computer programs, application programs, system programs, machine programs, operating system software, middleware, firmware, software modules, routines, subroutines, operation segments, methods, procedures, software interfaces, application program interfaces (API), instruction sets, computing code, computer code, code segments, computer code segments, words, values, symbols, or any combination thereof. In one implementation, for example, an article of manufacture may store executable computer program instructions that, when executed by a computer, cause the computer to perform methods and/or operations in accordance with the described implementations. The executable computer program instructions may include any suitable type of code, such as source code, compiled code, interpreted code, executable code, static code, dynamic code, and the like. The executable computer program instructions may be implemented according to a predefined computer language, manner, or syntax, for instructing a computer to perform a certain operation segment. The instructions may be implemented using any suitable high-level, low-level, object-oriented, visual, compiled, and/or interpreted programming language.

(A1) An example processor-implemented method for cost-efficiently performing repeated random sampling operations from a first sampling pool includes the steps of: (1) defining an array of elements to be selectively masked and unmasked throughout the repeated random sampling operations from the first sampling pool, the first sampling pool including unmasked elements of the array and excluding masked elements of the array; (2) identifying an exclusion element within the first sampling pool that is to be excluded from a sampling operation; (3) moving the exclusion element to a new position by swapping an array index of the exclusion element with an array index that was, during an immediately prior sampling operation, included within and bounding the first sampling pool; (4) masking the array index corresponding to the new position of the exclusion element; and (5) the sampling operation by randomly sampling from the first sampling pool.

(A2) In some implementations of A1, masking the array index corresponding to the new position of the exclusion element further comprises decrementing a size of the first sampling pool.

(A3) In still other implementations of A1 or A2, moving the exclusion element to the new position further comprises: swapping the array index of the exclusion element with an array index of a highest-indexed unmasked element in the array. Masking the array index corresponding to the new position further comprises masking the array index of the highest-indexed unmasked element.

The methods of A1-A3 are advantageous because they allow an element to be dynamically excluded from a sampling pool at a substantially constant computational cost regardless of the number of elements in the sampling pool.

(A4) In other implementations of A1-A3, the method further comprises identifying an inclusion element within the array at an array index that is masked, where the inclusion element is an element that is to be included in the sampling operation after being excluded from a number of previous sampling operations. The method further includes adding the inclusion element back into the first sampling pool by swapping a current array index of the inclusion element with a new array index that was, during an immediately prior sampling operation, external to and bounding the first sampling pool, and unmasking the new array index.

(A5) In still other implementations of A1-A4, wherein unmasking the new array index further comprises incrementing a size of the first sampling pool.

(A6) In still other implementations of A1-A5 adding the inclusion element back into the first sampling pool further comprises unmasking an array index of a lowest-indexed masked element in the array and subsequently swapping the array index of the inclusion element with the unmasked array index.

The methods of A4-A6 are advantageous because they allow an element previously excluded from a sampling pool to be dynamically re-added to the sampling pool at a substantially constant computational cost regardless of the number of elements in the sampling pool.

(A7) In still further implementations of A1-A6, the array is a source array that includes data sources available to provide data for migration in a data allocation system. Randomly sampling from the first sampling pool further comprises: randomly sampling a data source from the source array; identifying a collection of data chunks at the sampled data source available for migration; and sampling a data chunk from the collection of data chunks according to a predefined probability distribution.

(A8) In still further implementations of A1-A7, the method further includes randomly sampling a data destination from a destination array that includes data destinations available to receive migrated data in the data allocation system.

The methods of A7 and A8 is advantageous because they leverage the herein disclosed low-computational cost sampling techniques to drive an otherwise computationally-expensive process (e.g., homogeneity of a resource distribution by way of randomly-sampled data moves).

(A9) In additional implementations of A1-A8, identifying the exclusion element further comprises determining that the exclusion element violates a defined constraint.

(A10) In other implementations of A1-A9, identifying the inclusion element further comprises determining that a previously-identified exclusion element is no longer in violation of a defined constraint.

In another aspect, some implementations include a computing system (e.g., computing system for cost-efficiently performing repeated random sampling. The computing system includes hardware logic circuitry that is configured to perform any of the methods described herein (e.g., methods A1-A10).

In yet another aspect, some implementations include a computer-readable storage medium for storing computer-readable instructions. The computer-readable instructions, when executed by one or more hardware processors, perform any of the methods described herein (e.g., methods A1-A10).

The implementations described herein are implemented as logical steps in one or more computer systems. The logical operations may be implemented (1) as a sequence of processor-implemented steps executing in one or more computer systems and (2) as interconnected machine or circuit modules within one or more computer systems. The implementation is a matter of choice, dependent on the performance requirements of the computer system being utilized. Accordingly, the logical operations making up the implementations described herein are referred to variously as operations, steps, objects, or modules. Furthermore, it should be understood that logical operations may be performed in any order, unless explicitly claimed otherwise or a specific order is inherently necessitated by the claim language. The above specification, examples, and data, together with the attached appendices, provide a complete description of the structure and use of exemplary implementations.

What is claimed is:

1. A processor-implemented method for cost-efficiently performing repeated random sampling operations from a first sampling pool, the method comprising:
    defining a first array of elements to be selectively masked and unmasked throughout the repeated random sampling operations from the first sampling pool, the first sampling pool including unmasked elements of the first array and excluding masked elements of the first array;
    defining a dummy array for tracking locations of elements that are moved between different positions within the first array, the dummy array storing identifiers for the elements in the first array in association with pointers to current locations of the elements within the first array of elements;
    identifying an element within the first sampling pool that is to be excluded from a sampling operation;
    removing the element from the first sampling pool by:
        moving the element to a new position by swapping a first array index of the element with a second array index that was, during an immediately prior sampling operation, included within and bounding the first sampling pool; and
        masking the second array index corresponding to the new position of the element;
        updating a pointer associated with the element the dummy array to point to the second array index instead of the first array index; and
        implementing the sampling operation by randomly sampling from the first sampling pool;
    subsequent to the sampling operation, selectively adding the element back into the first sampling pool by:
        swapping the second array index of the element with a third array index that was, during an immediately prior sampling operation, external to and bounding the first sampling pool;
        updating the pointer associated with the element in the dummy array to point to the third array index instead of the second array index; and
        unmasking the third array index.

2. The processor-implemented method of claim 1, wherein masking the second array index corresponding to the new position of the element further comprises decrementing a size of the first sampling pool.

3. The processor-implemented method of claim 1, wherein moving the element to the new position further comprises:
    swapping the first array index of the element with an array index of a highest-indexed unmasked element in the first array; and wherein masking the second array index corresponding to the new position further comprises:
        masking the array index of the highest-indexed unmasked element.

4. The processor-implemented method of claim 1, wherein unmasking the third array index further comprises incrementing a size of the first sampling pool.

5. The processor-implemented method of claim 4, wherein adding the element back into the first sampling pool further comprises:
    unmasking an array index of a lowest-indexed masked element in the first array and swapping the second array index of the element with the unmasked array index.

6. The processor-implemented method of claim 1, wherein the first array is a source array that includes data sources available to provide data for migration in a data allocation system, and wherein randomly sampling from the first sampling pool further comprises:
    randomly sampling a data source from the source array;
    identifying a collection of data chunks at the sampled data source available for migration; and
    sampling a data chunk from the collection of data chunks according to a predefined probability distribution.

7. The processor-implemented method of claim 6, further comprising:
    randomly sampling a data destination from a destination array that includes data destinations available to receive migrated data in the data allocation system; and
    migrating data from the sampled data source to the sampled data destination.

8. The processor-implemented method of claim 1, wherein identifying the element further comprises determining that the element violates a defined constraint.

9. The processor-implemented method of claim 1, wherein selectively adding the element back into the first sampling pool is performed in response to determining that the element is no longer in violation of a defined constraint.

10. A system for cost-efficiently performing repeated random sampling from a first sampling pool, the system comprising:
    a first array defining elements eligible to be selectively masked and unmasked throughout repeated random sampling from the first sampling pool, the first sampling pool including unmasked elements of the first array and excluding masked elements of the first array;
    a dummy array that identifies current locations of masked and unmasked elements in the first array, the dummy array storing an identifier for each element in the first array in association with a pointer that identifies a current location of the element within the first array;
    a random sampling management tool stored in memory and executable to:
        identify an element within the first sampling pool that is to be excluded from a sampling operation;
        remove the element from the first sampling pool by:
            moving the element to a new position by swapping a first array index of the element with a second array index that was, during an immediately prior sampling operation, included within and bounding the first sampling pool; and
            masking the second array index corresponding to the new position of the element;
            updating a pointer associated with the element in the dummy array to point to the second array index instead of the first array index; and
            implementing the sampling operation by randomly sampling from the first sampling pool;
        subsequent to the sampling operation, selectively add the element back into the first sampling pool by:

swapping the second array index of the element with a third array index that was, during an immediately prior sampling operation, external to and bounding the first sampling pool;
updating the pointer associated with the element the dummy array to point to the third array index instead of the second array index; and
unmasking the third array index.

11. The system of claim 10, wherein masking the second array index corresponding to the new position further comprises decrementing a size of the first sampling pool.

12. The system of claim 10, wherein the random sampling management tool removes the element from the first sampling pool by performing operations including:
swapping the first array index of the element with an array index of a highest-indexed unmasked element in the first array and wherein masking the array index corresponding to the new position further comprises masking the element at the array index of the highest-indexed unmasked element.

13. The system of claim 10, wherein unmasking the third array index further comprises incrementing a size of the first sampling pool.

14. The system of claim 10, wherein adding the element back into the first sampling pool further includes:
unmasking an array index of a lowest-indexed masked element in the first array and swapping the second array index of the element with the unmasked array index.

15. The system of claim 10, wherein in the random sampling management tool identifies the element by determining that the element violates a defined constraint.

16. The system of claim 10, wherein the random sampling management tool selectively adds the element back into the first sampling pool in response to determining that the element is no longer in violation of a defined constraint.

17. The system of claim 10, wherein the first array is a source array that includes data sources available to provide data for migration in a data allocation system, and wherein implementing the sampling operation further comprises:
randomly sampling a data source from the source array;
randomly sampling a data destination from a destination array that includes data destinations available to receive migrated data in the data allocation system; and
migrating data from the sampled data source to the sampled data destination.

18. One or more computer-readable storage media encoding computer-executable instructions for executing a computer process, the computer process comprising:
defining a first array of elements to be selectively masked and unmasked throughout repeated random sampling operations from a first sampling pool, the first sampling pool including unmasked elements of the first array and excluding masked elements of the first array;
defining a dummy array for tracking locations of elements that are moved between different positions within the first array, the dummy array storing identifiers for the elements in the first array in association with pointers to current locations of the elements within the first array of elements;
identifying an element within the first sampling pool that is to be excluded from a sampling operation;
removing the element from the first sampling pool by:
moving the element to a new position by swapping first array index of the element with a second array index that was, during an immediately prior sampling operation, included within and bounding the first sampling pool;
masking the second array index corresponding to the new position of the element;
updating a pointer associated with the element the dummy array to point to the second array index instead of the first array index; and
implementing the sampling operation by randomly sampling from the first sampling pool; and
subsequent to the sampling operation, selectively adding the element back into the first sampling pool by operations that include:
swapping the second array index of the element with a third array index that was, during an immediately prior sampling operation, external to and bounding the first sampling pool;
updating the pointer associated with the element the dummy array to point to the third array index instead of the second array index; and
unmasking the third array index.

* * * * *